(12) United States Patent
Helnerus et al.

(10) Patent No.: US 12,005,798 B2
(45) Date of Patent: Jun. 11, 2024

(54) CHARGING DEVICE FOR ELECTRIC VEHICLES

(71) Applicant: Compleo Charging Solutions AG, Dortmund (DE)

(72) Inventors: Stefan Helnerus, Arnsberg (DE); Christian Müller-Winterberg, Dorsten (DE)

(73) Assignee: Compleo Charging Solutions AG, Dortmund (DE)

( * ) Notice: Subject to any disclaimer, the term of this patent is extended or adjusted under 35 U.S.C. 154(b) by 539 days.

(21) Appl. No.: 17/239,167

(22) Filed: Apr. 23, 2021

(65) Prior Publication Data

US 2021/0237598 A1 Aug. 5, 2021

Related U.S. Application Data

(63) Continuation of application No. PCT/EP2019/073092, filed on Aug. 29, 2019.

(30) Foreign Application Priority Data

Oct. 29, 2018 (DE) .......................... 102018126912.9

(51) Int. Cl.
*H02J 7/00* (2006.01)
*B60L 53/31* (2019.01)
*H01R 13/73* (2006.01)

(52) U.S. Cl.
CPC .............. *B60L 53/31* (2019.02); *H01R 13/73* (2013.01); *H02J 7/0013* (2013.01); *H02J 7/0045* (2013.01)

(58) Field of Classification Search
USPC ......................................................... 320/109
See application file for complete search history.

(56) References Cited

U.S. PATENT DOCUMENTS 6,975,508 B2 12/2005 Hoegener et al.
7,658,643 B2 2/2010 Tuerschmann et al.
(Continued)

FOREIGN PATENT DOCUMENTS

AT 507605 B1 2/2014
DE 102008056610 A1 5/2010
(Continued)

*Primary Examiner* — Samuel Berhanu
(74) *Attorney, Agent, or Firm* — Pauly, DeVries Smith & Deffner LLC

(57) ABSTRACT

A charging device for electric vehicles, comprising at least one docking station, at least one charging unit attachable to the docking station. The docking station has plurality of recesses. The charging unit has a plurality of bars insertable into the docking station recesses, each of which comprises at least one first locking element, at least one locking module movable between a locking position and an open position which has a plurality of second locking elements corresponding to the first locking elements. In the open position of the locking module, the bars are insertable into the recesses in such a way that the bars are movable into a snapping position, In the snapping position, the locking module is movable from the open position into the closed position such that the bars are positively fixable to the docking station by an interaction of the second locking elements with the first locking elements.

11 Claims, 19 Drawing Sheets

(56) References Cited

U.S. PATENT DOCUMENTS

| | | | | |
|---|---|---|---|---|
| 2011/0127946 A1* | 6/2011 | Anderson | ............... | B60L 53/51 |
| | | | | 320/101 |
| 2013/0020990 A1* | 1/2013 | DeBoer | ................... | B60L 53/18 |
| | | | | 320/109 |
| 2013/0229141 A1* | 9/2013 | Johnson | ........... | G06Q 10/06315 |
| | | | | 29/897.3 |
| 2017/0129356 A1* | 5/2017 | Johnson | ................... | B60L 53/63 |

FOREIGN PATENT DOCUMENTS

| | | |
|---|---|---|
| DE | 102010026593 A1 | 1/2012 |
| DE | 102015111099 A1 | 1/2016 |
| DE | 102016110937 A1 | 12/2017 |

\* cited by examiner

CHARGING DEVICE FOR ELECTRIC VEHICLES

CROSS-REFERENCE TO RELATED PATENT APPLICATIONS

This patent application is a continuation of International Application No. PCT/EP2019/073092, filed on Aug. 29, 2019, which claims the benefit of priority to German Patent Application No. 10 2018 126 912.9, filed Oct. 29, 2018, the entire teachings and disclosures of both applications are incorporated herein by reference thereto.

FIELD OF THE INVENTION

The application relates to a charging device for electric vehicles with a charging unit attachable to a docking station. In addition, the application relates to a charging station with a charging unit.

BACKGROUND OF THE INVENTION

The development of the charging infrastructure is of decisive importance for the widespread establishment of electro mobility. To this end, it is particularly necessary to install charging stations for electric vehicles on a large scale in both public and partially public areas. The charging stations should fit into the street scene and are therefore usually designed as charging columns. Charging columns are characterized, in particular, by a compact design with a small base area. The charging columns usually have a column-like structure and integrated or connectable charging electronics for charging an electric vehicle.

In the present context, an electric vehicle is understood to mean a vehicle that can be at least partially operated electrically and includes a rechargeable electric storage unit.

As mentioned, the extensive expansion of the charging infrastructure is a key factor in the acceptance of electro mobility. Therefore, charging columns must be installed as comprehensively as possible and in large numbers within a short period of time. This is a challenge in terms of the design, construction and actual on-site installation of the charging columns, since the use on a huge scale of charging columns means that they must be manufacturable on an industrial scale and should be particularly easy to install on site, preferably by a single person.

This is only partly the case with existing charging columns. On the one hand, on-site installation is complex and costly. On the other hand, the electronics in the charging columns cannot yet be produced cost-effectively and in large quantities. In addition, a plurality of manual operations, in particular, complex steps, are usually required, for which a specialist would normally have to be called in. The same applies to maintenance work and/or the replacement of charging technology, which becomes necessary, for example, due to defects or technology changes.

Therefore, the object of the application is to provide a charging device for electric vehicles that simplifies the installation and maintenance of a charging station and, in particular, enables an installation by a layperson.

BRIEF SUMMARY OF THE INVENTION

The object is solved according to a first aspect of the application by a charging device for electric vehicles according to claim 1. The charging device comprises at least one docking station. The charging device comprises at least one charging unit attachable to the docking station. A plurality of recesses are provided in the docking station. The charging unit comprises a plurality of bars insertable into the recesses of the docking station. The bars comprise each at least one first locking element. The charging device comprises at least one locking module movable between a locked position and an open position. The locking module comprises a plurality of second locking elements corresponding to the first locking elements. In the open position of the locking module, the bars are insertable into the recesses such that the bars are movable to a snapping position. In the snapping position, the locking module is movable from the open position into the closed position such that the bars can be positively fixed to the docking station by an interaction of the second locking elements with the first locking elements.

In contrast to the prior art, according to the application an easy-to-install charging device for a charging station is provided in that the charging device is formed in a modular manner by a docking station and a charging unit attachable thereto. Here, the locking mechanism according to the application enables the charging unit to be attached to the docking station in a simple manner. In particular, the charging unit can be installed to a docking station in a few simple steps and even by inexperienced persons. In particular, the connection to the power supply is decoupled from the other charging technology, so that it can be ensured that even laypersons can install charging technology. Also the possible maintenance and replacement of charging technology installed in the charging unit, which becomes necessary due to defects or technology changes, for example, are also possible in a simplified manner according to the charging device according to the application.

The charging device is configured to exchange electrical energy with electric vehicles and, in the intended use, can be installed, in particular, in a charging station.

A charging device according to the application comprises a docking station and a charging unit. The docking station is formed, in particular, as a connection level. The charging unit is formed, in particular, as a supply level and can preferably be placed on the docking station.

The charging unit may comprise a housing in which the charging technology of the charging unit may be integrated. The housing may preferably be formed by a tub assembly and a cover assembly connectable to the tub assembly. The connection of the charging technology to a power supply is carried out in the manner of a modular system by mounting and fastening, respectively, the charging unit to a docking station. This mounting is preferably done without tools by means of the locking module according to the application.

In order to attach the charging unit to the docking station, the docking station comprises a plurality of recesses, in particular, openings provided in the docking station. The charging unit comprises a plurality of bars corresponding to the recesses. Corresponding in the present context means, in particular, that the bars are shaped and/or positioned on the charging unit in such a way that they can be introduced and inserted, respectively, into the recesses (for a mounting) of the docking station.

For a (permanent) locking of the charging unit to the docking station, a locking module is provided which is movable at least between an open position and a locking position. In particular, the locking module interacts with the bars in such a way that, in the open position, they are insertable into the recesses of the docking station as far as a locking position, usually an end position, and can be positively fixed to the docking station by moving the locking module into the locking position.

For fixation, in particular, each bar comprises a first locking element and the locking module comprises a corresponding plurality of second locking elements, each of the second locking elements corresponding to the respective first locking element. Corresponding in the present context means, in particular, that the first and second locking elements are shaped in such a way that, in the open position, the locking elements arranged on the bars can be inserted into the recesses of the docking station until the snapping position is reached and interact with the second locking elements in such a way that, in the snapping position, it is possible to move the locking module into the locking position and, in this locking position, a fixation of the bars occurs. Preferably, a first locking element may be interlocked (snapped) with a corresponding second locking element in the locking position.

In particular, the first locking elements cooperate (interact) with the second locking elements in such a way that the bars are positively fixable to the docking station. In other words, a movement of the bars out of the recesses of the docking station in the locking position is blocked by the interaction of the locking elements, so that, in particular, the charging unit is fixed and locked, respectively, to the docking station. In other words, by locking the charging unit to the docking station, a charging device can be produced in the assembled state.

As has already been described, the charging unit may preferably include a tub assembly and a cover assembly. At least one power module may be arranged in the tub assembly. The power module, also referred to as the HPS (High Power Safety) module, comprises, in particular, components necessary for power control and power monitoring.

In addition, a first charge control circuit as well as a charge outlet may be arranged within the tub assembly. The components arranged in the tub assembly may be sufficient to provide basic functionalities for charging an electric vehicle.

Preferably, the tub assembly comprises a bottom, which may face to a protective housing cover of the docking station when the charging device is mounted. The side of the tub assembly opposite the bottom is preferably substantially closed by the cover assembly.

In particular, the cover assembly is used to house at least one communication module and at least one user interface module. The communication module can be used, for example, to extend the charging functions of the power module and, in particular, to implement extended protocol functionalities. A user interface module makes it possible, in particular, to implement an interaction with a user. The power module is preferably configured to provide a power supply for a communication module and/or a user interface module.

The communication module may optionally be connected to a wide area network connection arranged within the docking station. Also, the communication module may optionally be connected to a connection to a charging network within the docking station. Also, the communication module may establish a communication in a near field (e.g., Bluetooth, Wireless Local Area Network (WLAN), etc.).

The communication module, also called ECU (Electronic Control Unit) module, can act as a control computer and communication gateway.

The user interface module, also called UIB (User Interface Board) module, comprises, in particular, operating elements and/or display elements, for example in each case at least one display, a touch display, a pictogram, a capacitive/inductive touch sensor and/or an environment sensor. These can be controlled and/or read out by the UIB. The UIB can be connected to the ECU module in a modular manner within the charging unit, wherein a UIB in a basic function can have only status LEDs for displaying the operating status as a display element, and in a multi-element configuration can comprise and/or control at least one of the additional operating elements and/or display elements mentioned above.

The charging unit can be electrically coupled to the docking station via a power connection. In particular, when the locking module is in the locked position (with bars inserted in the recesses), i.e. when the charging unit is mechanically coupled to the docking station, an electrical coupling is provided by the power connection between the docking station and the charging unit.

Within the docking station, a printed circuit board can be arranged as a mains board, which comprises the power connection. For a secure tool-less coupling between the charging unit and the docking station, the printed circuit board of the mains board may be arranged in the docking station in a plane parallel to the bottom of the docking station and/or parallel to the plane of the protective housing cover of the docking station, or the HPS module may be arranged in a plane parallel to the bottom of the tub assembly, preferably in a floating manner.

Within the docking station, a functional separation may be provided between the power electronics and the communication electronics. For this purpose, a printed circuit board can be configured within the docking station next to the mains board as an interface board, on which external data connections are connected to corresponding connection sockets. The connection sockets can be connected via patch cables, which can be inserted into the tub assembly of the charging unit in the assembled state of the charging device, where they can be connected, in particular, to the ECU module.

Preferably, the interface board comprises a connector socket which comprises connections for a General Purpose Input/Output (GPIO) bus on the one hand and a CAN bus on the other hand. This makes cabling between the interface board and the ECU module particularly simple, since two different buses can be routed via a single cable.

The connection of a LAN (Local Area Network) between the interface board and the ECU is preferably made via a patch cable, wherein connections of two LAN networks operated separately from each other can also be routed on one cable and in the respective sockets. Thus, a connection of two different local networks is possible via a single cable.

The tub assembly is preferably a tub-shaped housing with side walls or a circumferential side wall. In particular, the side walls surround the power module circumferentially, preferably completely circumferentially. Thus, a lateral seal of the tub assembly can be provided by means of the side walls.

An outlet for a charging cable can be provided in the side wall. A permanently attached charging cable can be connected by means of the charging outlet if no charging socket is to be installed electrically. The outlet for the charging cable is preferably arranged in a recess of a side wall. The side wall may recess into the interior of the tub assembly, in particular, into the area where a charging port is arranged. In the event that a permanently attached charging cable is used, a non-wired charging jack may be disposed within the tub assembly to act as a "plug garage".

Further, the tub assembly comprises preferably a bottom. In the assembled state of the charging device, the bottom of the tub assembly preferably abuts a protective housing cover of the docking station. Preferably, the bottom faces the protective housing cover of the docking station.

As explained above, the HPS module may be formed as a printed circuit board. To ensure that the HPS module is particularly easy to couple to the power connector on the docking station, the HPS module is floatingly supported. The floating mounting (support) makes it possible to align the plug and socket of the power connector with respect to each other during assembly of the charging device by using guide means to displace the respective printed circuit board, which is floatingly mounted, in the plane of the mounting if necessary.

According to a preferred embodiment of the charging device according to the application, the charging unit may comprise at least one tub assembly. The plurality of bars may be arranged on the bottom side of the tub assembly, and in particular, may extend away from the interior of the tub assembly. This allows the bars to engage in the recesses so that, in particular, in the snapped position of the bars, the bottom of the tub assembly preferably abuts and contacts, respectively, the protective housing cover of the docking station. By subsequently fixing the bars to the docking station, in accordance with the above embodiments, the charging unit can be locked to the docking station with the bottom in contact accordingly.

The locking module may, according to a further embodiment of the charging device according to the application, be formed as a locking bracket with two legs extending substantially parallel to each other and a connecting element connecting the legs. Each leg may comprise at least one second locking element. In particular, the locking module may have a substantially U-shaped form. Two second locking elements can be provided in each leg, preferably spaced apart from one another, wherein the first locking elements can, in particular, engage into the second locking elements.

The legs can be connected to one another via a connecting element. The connecting element can additionally form a handle element. A user can move the locking module between the open position and the locking position in a simple manner by means of the handle element.

According to a particularly preferred embodiment of the charging device according to the application, a bar may comprise a pin section with a locking head as a first locking element. In particular, the pin section may adjoin a bar section connected to the bottom of the charging unit. In particular, the end of a bar that is free in the unassembled state may be formed by the locking head, which may adjoin the pin section. For example, the pin section may be formed by an undercut. In particular, the thickness of the pin section is less than the thickness of the locking head.

In the snapping position, a movement of the locking module from the open position to the locking position may cause the locking head to be engaged behind by a recess in the locking module. A recess in the locking module forms, in particular, a second locking element.

By engaging behind, in particular, the bar is positively fixed to the docking station. A movement of the bar in this locking position is prevented by the positive lock formed between the locking head and the recess. In particular, an inner diameter of the recess may correspond to the thickness of the pin section such that the pin section is insertable into the recess. The inner diameter may further be dimensioned to be less than the thickness (and outer diameter, respectively) of the locking head, such that movement of the bar in a direction along the recess is blocked in the locking position.

Preferably, in the snapping position, the locking head may be passable through a recess of the locking module formed as a second locking element, such that movement of the locking module from the open position to the locking position causes the locking head to be engaged from behind.

As has been already described, a plurality of bars may be provided on the charging unit and a plurality of corresponding recesses may be provided on the docking station. Preferably, the charging unit may have four corner sections, each of which may have a previously described bar disposed therein. The docking station may (also) have four corner regions, wherein a recess corresponding to a respective bar may be arranged in each of the corner regions. By arranging the bars and the recesses in the corner regions of the respective modules, a particularly secure locking of the charging unit to the docking station can be provided.

According to a further embodiment of the charging device according to the application, the movement between the locked position and the open position can be carried out along a straight line.

According to a further embodiment of the charging device according to the application, in order to support slipping and insertion, respectively, of the bars, in particular, of the pin section, into the respective recess, the locking head may have a beveled surface, wherein the beveled surface may be arranged on the side of the locking head facing the (respective) second locking element in the open position of the locking module. In particular, all locking heads (and domes, respectively) may be formed accordingly.

In order to prevent a faulty locking and, in particular, insufficient fastening, the locking module can preferably be movable from the open position to the locking position only if all of the bars of the charging unit are within the recesses of the docking station in the snapping position. In the event that one or more bar(s) is/are not yet in the snapped position, a movement of the locking module to the locking position may be inhibited, for example, by blocking insertion of the pin section of the bar not in the snapped position into the corresponding recess of the locking module.

In addition, it has been recognized that when there are a plurality of bars, for example, one bar arranged in each corner region of the charging unit (i.e., four bars), simultaneously inserting of these bars into the snapping position and moving the locking module into the locking position may be complex and difficult for a single user to handle.

To further simplify attaching the charging unit to the docking station, according to a preferred embodiment of the charging device according to the application, it is proposed that the locking module may be movable from the open position to an intermediate locking position when at least one first bar is in the snapping position. The locking module may be movable from the intermediate locking position to the locking position when at least one second bar is in the snapping position.

In particular, it may be provided that initially only the at least one first bar, for example, the first bars arranged in the lower corner regions (or upper corner regions), are inserted into the first recesses of the docking station until they are in the snapping position. Then, the locking module can be moved to the intermediate locking position. In the intermediate locking position, the at least one first locking member of the at least one first bar is engaged with the corresponding second locking member such that movement of the first bar out of the recess is blocked. In particular, the at least one first bar is (already) fixed to the docking station in the intermediate locking position.

In a next step, it may be provided that the at least one second bar, for example the second bars arranged in the upper corner regions (or lower corner regions), are inserted into the second recesses of the docking station until they are (also) in the locking position. Then, the locking module can be moved from the intermediate locking position to the locking (end) position.

Advantageously, this allows, at first, to exert pressure to the bottom side (or other side) by a user, causing the locking module, in particular, the snapping bracket, to move to the intermediate snapping position or "snapping end" position. Subsequently, pressure can be exerted to the top side (or other side) of the charging unit by a user, causing the locking module, in particular, the snapping bracket, to move to the locking (end) position. Through this mechanism, in particular, a two-hand operation is possible.

According to a further embodiment, the locking module may be permanently integrated in the docking station. In particular, the docking station may comprise at least one guide configured to guide the locking module during a movement between the open position and the closed position. In particular, two guides may be provided corresponding to the two legs of a locking bracket for moving the legs between the open position (possibly via an intermediate locking position) and the locking position. Integrated is to be understood that the locking module cannot be separated from the docking station in a non-destructive manner. In particular, the locking module remains in the docking station during all operating conditions. A separate module for fastening is not required.

In order to further simplify the fastening of the charging unit to the docking station, according to a preferred embodiment, at least one spring element may be mounted between the locking module and the docking station such that in the open position a force acting in the direction of the locking position is exerted on the locking module by the spring element. In particular, this may provide an automatic movement of the locking module from the open position to the locking position when the legs are in the snapped position. For example, a spring element may be provided between each leg and the docking station.

Furthermore, according to a further embodiment of the charging device according to the application, at least one fixing element may be provided configured to fix the locking module in the locking position in such a way that a movement of the locking module is blocked when the fixing element is fixed. This can ensure that the locking module does not inadvertently move to the open position and inadvertently release the charging unit from the docking station. For example, a screw may be provided as a fixing element. For example, one screw may be provided per leg of a locking bracket. In particular, by making a corresponding screw connection, a movement of the locking module can be blocked. By loosing the at least one screw, a movement of the locking mode can be released.

In a further embodiment of the charging device, at least one sealing element may be provided between the docking station and the charging unit. In the locking position (in which all bars are in the snapped position) and in the assembled state of the charging device, respectively, a seal may be provided between the docking station and the charging unit. In particular, in the locking position and the assembled state of the charging device, respectively, a clamping of the sealing element (e.g., a compression of a foam seal or the like) between the charging unit, in particular, the tub assembly of the charging unit, and the docking station, in particular, the protective cover housing of the docking station, can be provided and, in particular, maintained in the assembled state of the charging device. In particular, the bars, recesses and locking module may be dimensioned and designed accordingly.

According to a preferred embodiment, it may be provided that the protective housing cover preferably recedes (recesses) from the upper plane of the docking station, so that the side walls of the docking station protrude above the protective housing cover in a collar-like manner in the assembled state of the protective housing cover. This makes it possible to ensure, by means of the side walls, a sealing of the docking station in the assembled state of the charging device, in that, for example, circumferential sealing lips are provided in the charging unit corresponding to the side walls as a sealing element, which sealing lips are pressed against the edges of the side walls in the assembled state and are held there as a result of the locking mechanism described above. By virtue of the fact that the protective housing cover recesses, it can be ensured that the sealing lips completely engage around the side walls.

In a further aspect of the application, a charging station is provided. The charging station comprises at least one charging column having a receptacle. The charging station comprises at least one previously described charging device arrangable in the receptacle.

The charging column may include a charging column base and a charging column head. In such a charging column, a receptacle is provided, in particular, in the charging column head, which receptacle may be surrounded by circumferential side walls. The docking station can be arranged in this receptacle. The mains connection cable can be inserted into the docking station within this receptacle.

After installation of the docking station in the receptacle, an annular gap can be formed between the side wall of the docking station and the receptacle. A housing wall of the charging unit can engage in this annular gap. If the charging unit is coupled to the docking station in the manner described above and, in particular, locked, the charging unit is placed on the docking station from above. Circumferential side walls of the charging unit can engage in the annular gap so that it is not apparent from the outside of the charging column that the charging unit is placed on a docking station.

Also, the charging column head can be formed from two opposing front surfaces, each of which can have a receptacle for a respective docking station.

As has already been described, the charging unit comprises a power module (HPS module), a communication module (ECU module), and a user interface module (UI module), wherein the power module comprises a first charge control circuit for charge control with an electric vehicle. The requirements for charging units can be highly diverse depending on the intended use. Nevertheless, it is desired to create, as far as possible, a uniform structure of a charging unit, which can be adapted according to the needs. In particular, it is initially necessary for the charging unit to include basic charging control functions. Therefore, a first charge control circuit is, in particular, arranged on the power module.

Additional functions, such as advanced charging functionalities, billing, communication, user interaction and the like may or may not be required as needed. For this reason, it is, in particular, proposed that a communication bus connects the communication module and the user interface module to the power module. The communication bus can be used to couple the communication module and/or the user interface module as needed.

The function of the power module, in particular, the charging control circuit, is initially independent of this, so that the charging unit can be configured to provide charging functionalities even without a communication module connected to the communication bus. If the communication module is coupled, more advanced functions, such as encryption of charging data, exchange of charging parameters, transmission of information and the like, can be provided by the communication module.

It should be noted that devices, modules, etc., according to the application may be formed by hardware components (e.g., processors, interfaces, memory means, etc.) and/or software components (e.g., code executable by a processor).

The features of the charging devices and charging stations can be freely combined with each other. In particular, features of the description and/or of the dependent claims may be independently inventive, even by completely or partially bypassing features of the independent claims, either alone or freely combined with each other.

BRIEF DESCRIPTION OF THE DRAWINGS

There are now a plurality of possibilities for designing and further developing the charging device according to the application and the charging station according to the application. In this regard, reference is made on the one hand to the patent claims subordinate to the independent patent claims, and on the other hand to the description of embodiment examples in connection with the drawing. In the drawing shows:

DETAILED DESCRIPTION OF THE INVENTION

Figure 1:
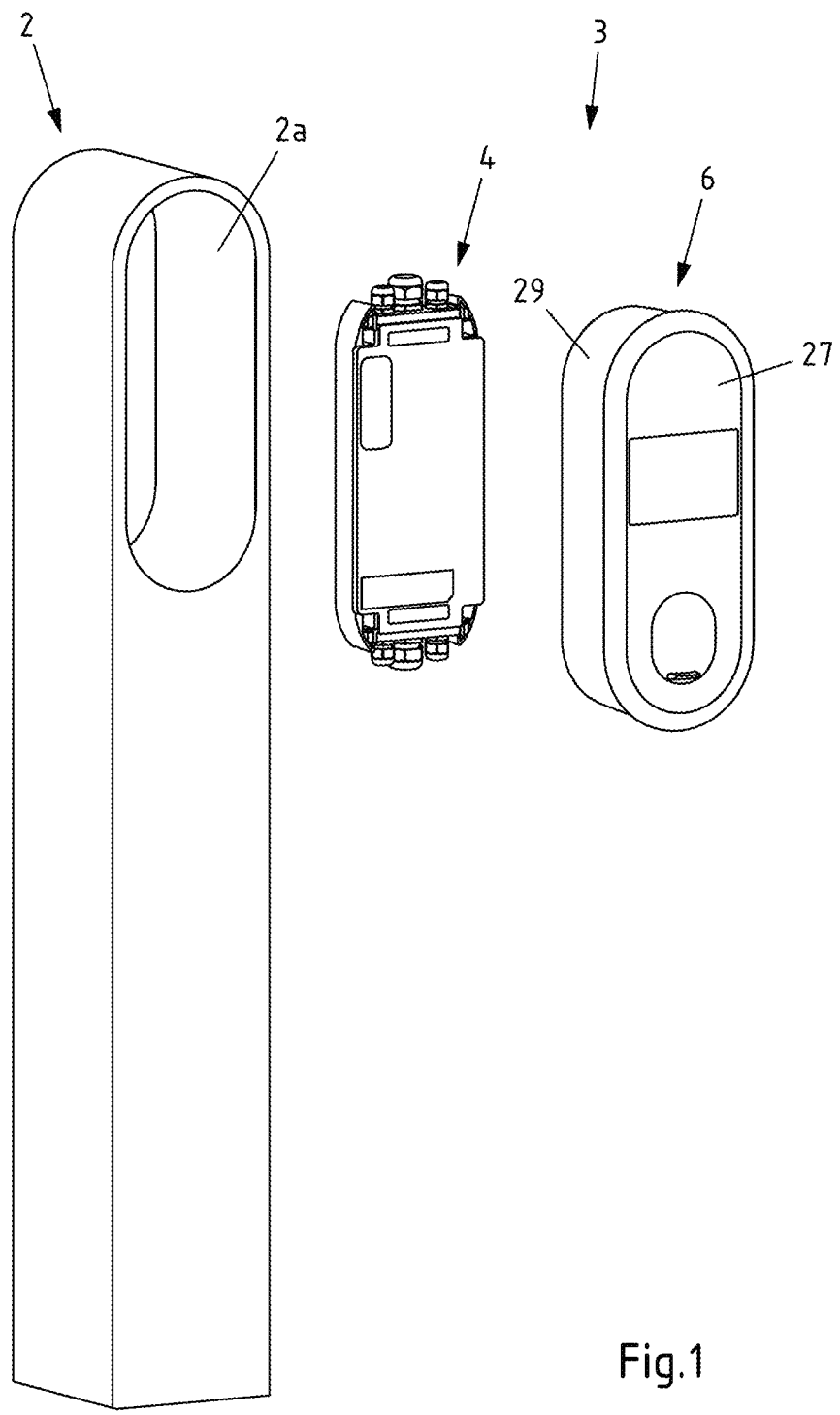
FIG. 1 is a schematic view of a charging station.

FIG. 1 shows an embodiment of a charging station 2 in the form of a charging column 2, with a head in which a receptacle 2a is provided. The receptacle 2a of the charging column 2 is provided for receiving a docking station 4 and a charging unit 6. The docking station 4 may be fixed in the receptacle 2a in a manner not further described.

The charging column 2 may comprise an electrical connection to a (not shown) power grid or another power source (e.g., electrical generator), which connection may be connected to the docking station 4.

The charging unit 6 may comprise a housing 29 having a cover 27. In particular, the charging unit 6 may be assembled as an assembly comprising a tub assembly and a cover assembly, which will be described in more detail below, and may be placed on the docking station 4 and preferably mechanically fixed to the docking station 4, as will be described in more detail below.

Together with the mechanical fixation, the charging unit 6 may be electrically coupled to the docking station 4 via a plug/socket. A communication coupling between the docking station 4 and the charging unit 6 may be provided via at least one patch cable or the like. This can also be done together with the mechanical fixation.

In an installed state, the docking station 4 is preferably completely accommodated in the receptacle 2a and the charging unit 6 (substantially) completely surrounds, in particular, the outer edge of the docking station 4. With its side edges, the charging unit 6 can also be at least partially received in the receptacle 2a.

If necessary, the docking station 4 can also be mounted directly on a wall without the need for the charging station 2 with the receptacle 2a. Even then, the side walls of the docking station 4 are preferably at least partially enclosed by side walls of the charging unit 6.

As can further be seen from FIG. 1, the base surfaces of docking station 4 and charging unit 6 are approximately congruent with one another, so that in the assembled state, viewed from the front, the charging unit 6 completely covers the docking station 4.

In the present case, the docking station 4 and the charging unit 6 form a charging device 3 according to the application.

Figure 2:
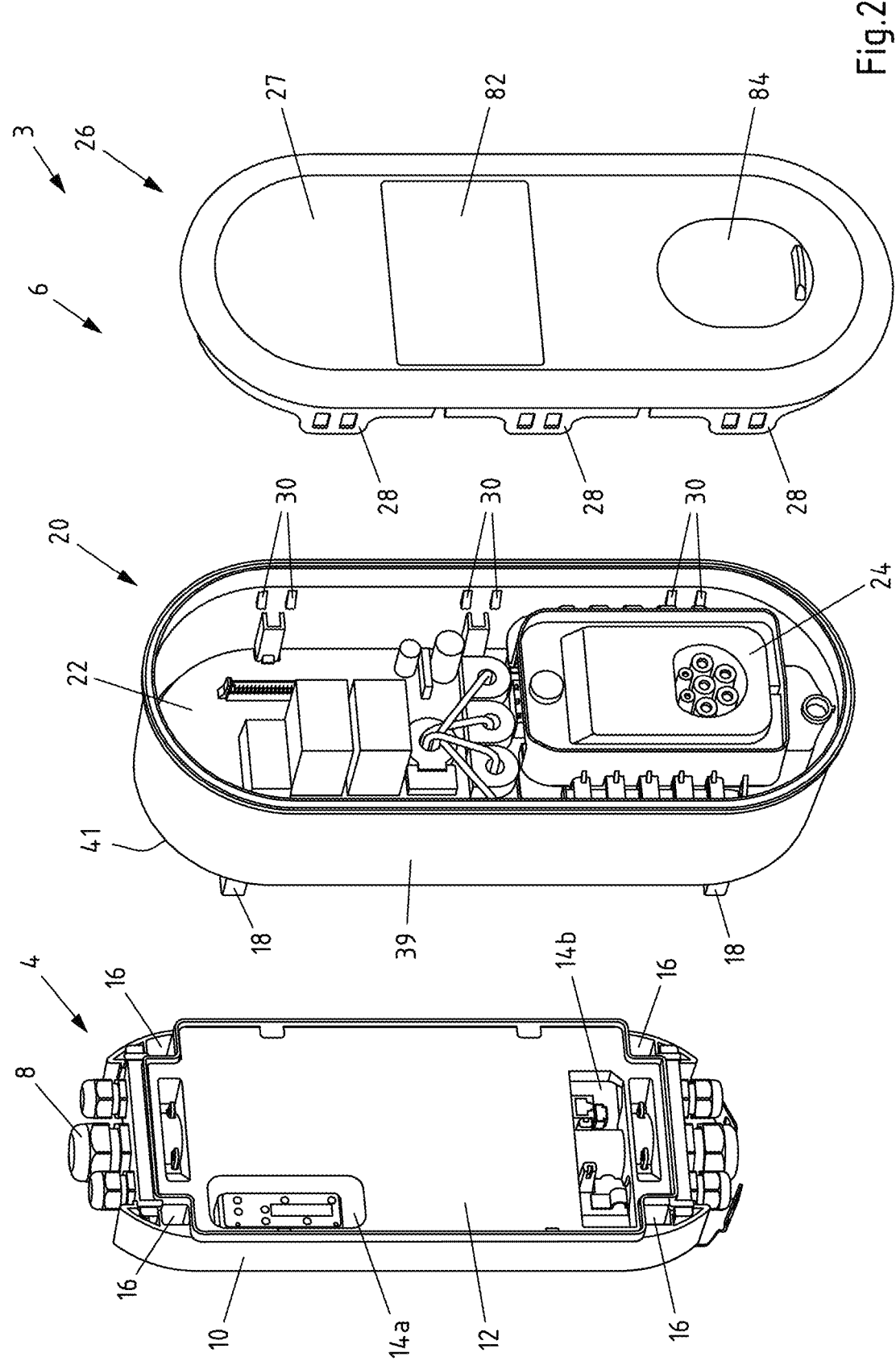
FIG. 2 is an exploded view of a charging station with docking station and charging unit.

The modular structure of the charging device 3 in the form of the docking station 4 and the charging unit 6 is shown in more detail by way of example in FIG. 2.

In FIG. 2, the docking station 4 is first shown, which may have a cable entry 8 in a side wall 10. The docking station 4 is at least partially closed by a protective housing cover 12 on the side facing the charging unit 6. At least one recess 14a, 14b is provided in the protective housing cover 12, which will be described in more detail below.

Preferably, the charging unit 6 may be formed from a tub assembly 20 and a cover assembly 26, wherein the outer walls of these assemblies form the housing 29 (e.g., tub bottom 41, peripheral side wall 39 and cover 27). It shall be understood that in other variants of the application, the housing of a charging unit may be formed in another form.

The docking station 4 comprises a plurality of recesses 16, in particular, in the form of openings 16. For example, openings 16 may be provided between the protective housing cover 12 and the side wall 10 of the docking station 4. Through these openings 16, in particular, a corresponding plurality of bars 18 of the charging unit 4, in particular, of the tub assembly 20, can be inserted into the docking station 4 so that the tub assembly 20 and thus the charging unit 6 can be fixed to the docking station 4 via the bars 18, as will be described in more detail below.

As explained above, the tub assembly 20 can be coupled to the docking station 4. The tub assembly 20 is part of the charging unit 6, which may additionally include the cover assembly 26. In particular, the tub assembly 20 may comprise a power module 22 and a charging receptacle 24. The tub assembly 20 is substantially closed on the bottom side by a bottom 41 and is closed on the cover side by the cover assembly 26, in particular, the cover 27.

In other variants of the application, a power module may also be arranged in another element of the charging station.

Preferably via snapping elements 28, the cover assembly 26 can be fixed to corresponding snapping elements 30 in the circumferential side wall 39 of the tub assembly 20. The cover assembly 26 may comprise a shutter 32 and/or control elements, such as a display 96, in its cover 27.

In the joined or installed (assembled) state, the cover assembly 26 is mechanically joined to the tub assembly 20 and thus seals the tub assembly 20 on a top side. On the bottom side, the tub assembly 20 is joined to the docking station 4 and a seal can be made between the docking station 4 and the tub assembly 20 by the side walls 10 of the docking station 4 when a lock is established by a locking module, as will be described in more detail.

A seal may be made between the cover assembly 26 and the tub assembly 20 along the outer edge which faces the cover assembly 26.

In particular, the docking station 4 serves as a connection level and may be connected to a power supply network or another power source independently of the charging unit 6. As long as the charging unit 6 is not coupled to the docking station 4, the charging unit 6 is voltage-free. By a mechanical coupling of the charging unit 6 to the docking station 4, the charging unit 6 is connected to the power supply network, in particular, also electrically. The charging unit 6 can be understood as a supply level, which in the present case can comprise charging technology, communication technology and other "intelligence".

This modular design of the charging device 3 makes it possible, in particular, to first mount the docking station 4 by a fitter qualified for this purpose, without the need to immediately mount a charging unit 6.

The charging unit 6 can be coupled to the docking station 4 at any later time, even by a technical layman, in a particularly simple manner, mechanically without tools, whereby the charging unit 6 is then automatically electrified. The illustrated charging unit 6 is particularly flexible and modular due to its special design comprising a tub assembly 20 and a cover assembly 26, as explained previously, and can be coupled to suit the particular application.

Figure 3:
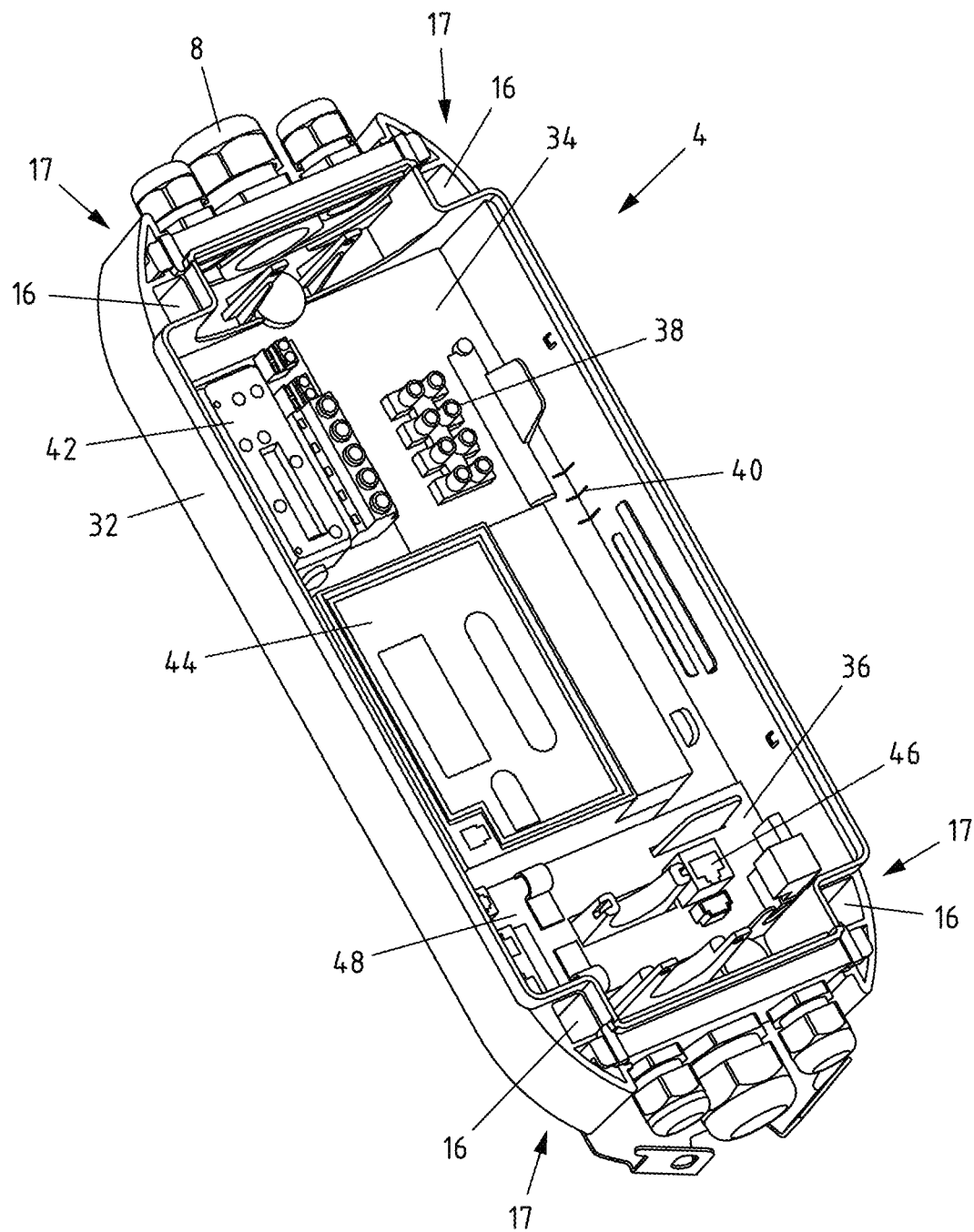
FIG. 3 is a view of an opened docking station.

An exemplary docking station 4 is shown in more detail in FIG. 3. The docking station 4 shown comprises a bottom and side walls 32 and, in each of the four corner regions 17, a recess 16. A recess 16 is arranged to receive a bar 18 of a charging unit 6 corresponding to the respective recess 16.

A mains board 34 and an interface board 36 are arranged on the bottom of the docking station 4. A connection strip 38 for connecting a power supply cable is provided on the mains board 34.

Scale lines 40 may be provided on the side walls 32 and/or the bottom.

In addition to the connection strip 38, a power connection 42 is also arranged on the mains board 34 as a socket.

In addition, a receptacle 44 is provided between the side walls 32. The receptacle 44 can be closed by a cover. A measuring device, e.g. a smart meter or an iMS, can be anchored in the receptacle 44 in a snapping manner. Not shown are cable bushings through the side walls of the receptacle 44 to wire the meter. The receptacle 44 can be sealed via suitable holes, which is not shown in detail.

Connectors 46, 48 are provided on an interface board 36 for a network cable and for a CAN (controller area network) bus and/or a GPIO (general purpose input/output bus) bus. In addition, connector sockets may still be provided for connection to modules located within the charging unit 6.

External wiring to a local network can be provided via a connection strip, which can then be tapped, for example, via an RJ45 socket. In particular, sufficient contacts are provided here to connect at least two independent local networks. Hereby, for example, a first local network can be formed with a central unit and a second local network between master and slave units, i.e. between a charging unit with a master controller with at least one, preferably several charging units with only one slave controller. The two local networks can be connected together via a single patch cable to the charging unit 6 and the modules arranged therein, respectively.

To install the docking station 4, it is first mechanically fixed either in the receptacle 2a or screwed to a wall, for example. A multi-core power cable is then inserted into the interior of the docking station 4 through the cable entry 8. This cable has, in particular, large cable cross sections and a rigid cable core. As a result, the cables are generally difficult to process.

To ensure that the cables are always cut to the correct length, the fitter can place the cable against the scale 40 and cut it to length immediately. This allows the fitter to assemble the connection cable correctly so that he can apply it on the connection strip 38 without any problems in the connection.

Depending on the assembly, a measuring device can be arranged in the receptacle 44. This measuring device is wired via flexible cables starting from the connection strip 38. Starting from the measuring device, wiring is again carried out via flexible cables to a power connection 42. If no measuring device is installed, wiring is carried out directly via a flexible cable between the connection strip 38 and the power connection 42. A connection strip for receiving the respective cables is also provided at the power connection 42.

A network cable can also be inserted into the housing of the docking station 4 via the cable entry 8 and applied to the connections 48.

Figure 4:
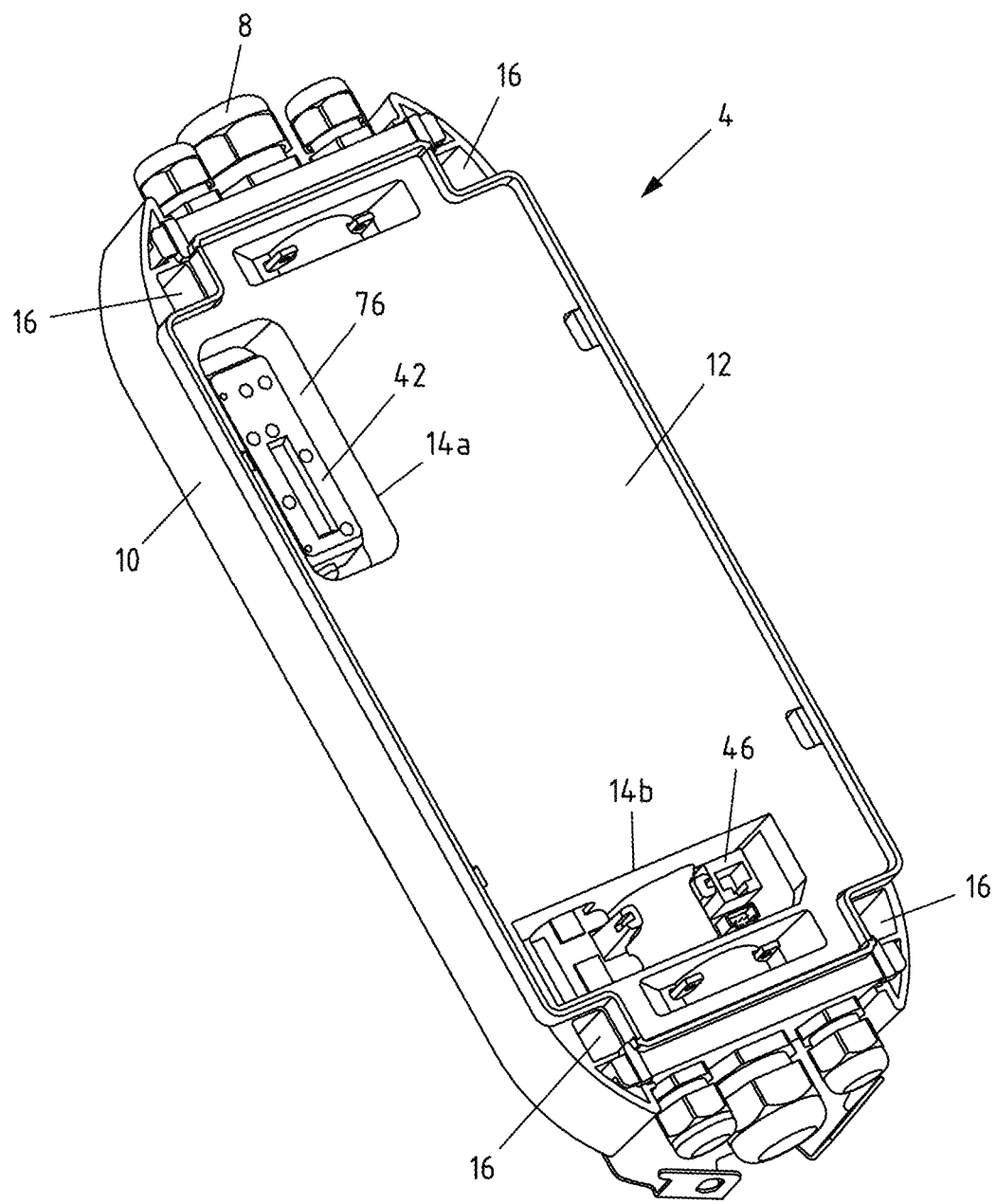
FIG. 4 is a view of a closed docking station.

After the electrical wiring has been carried out, the housing of the docking station 4 is closed by a protective housing cover 12, as exemplarily shown in FIG. 4.

In FIG. 4, it can be seen that in addition to the recess 14a for the power connector 42, the protective housing cover 12 comprises at least one further recess 14b for the communication connectors of the interface board 36, in particular, an RJ45 connector as well as a GPIO connector and a CAN bus connector. Via the RJ45 socket 46, an RJ45 connector can establish a connection to two LAN networks that are separated from each other.

In the present embodiment, the previously described openings 16 or recesses 16 are also provided on the side edges of the protective housing cover 12. According to the illustrated preferred embodiment, the openings 16 are located between the protective housing cover 12 and the side wall 10 of the docking station 4. Through the openings 16, the bars 18 of the tub assembly 20 can be inserted into the docking station 4, so that these bars 18 are in particular completely received by the side wall 10 of the docking station 4 (in a snapping position). By means of a locking module, which will be described in more detail, the charging unit 6 is mechanically anchored by the tub assembly 20 within the docking station 4 in the assembled state.

After the docking station 4 has been installed in the manner shown, the docking station 4 may remain initially unequipped, protected by the protective housing cover 12, and can be equipped at any later time with a charging unit 6, for example, comprising a tub assembly 20 and a cover assembly 26.

Figure 5:
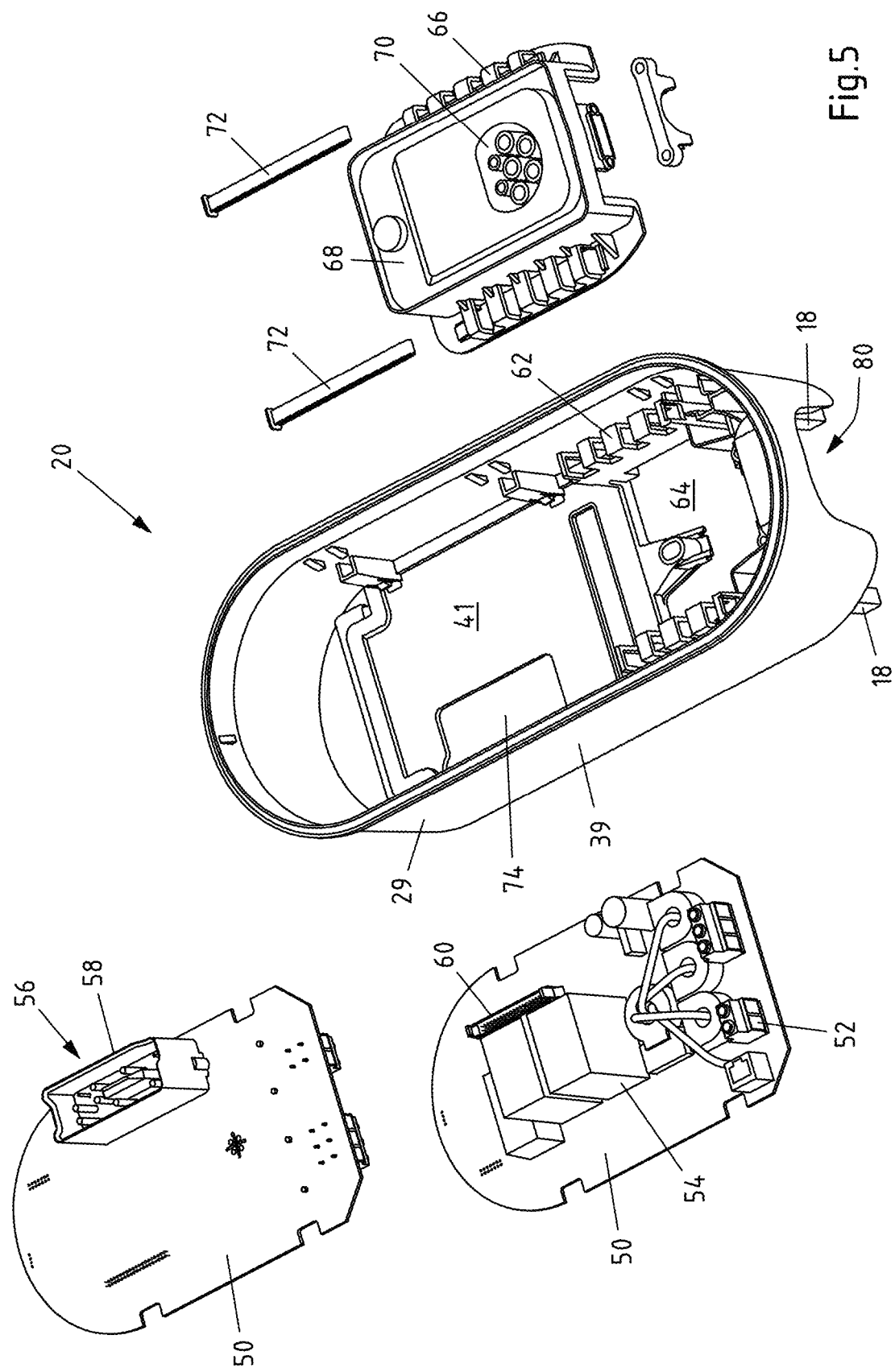
FIG. 5 is an exploded view of a tub assembly of a charging unit.

A tub assembly 20 is shown in more detail according to one embodiment in FIG. 5.

The tub assembly 20 comprises a housing 29 with side walls 39 and a circumferential side wall 39, respectively, and a bottom 41. In the area of the side walls 39, respectively of the bottom 41, a power module 50 can preferably be arranged on the bottom side and, in particular, be mechanically anchored in the tub assembly 20. The power module 50 may, in particular, be formed as a printed circuit board with components arranged thereon and/or components integrated therein.

The power module 50 preferably comprises a charging connection 52 as well as a charging control circuit 54. On the bottom side of the power module 50, as also shown in FIG. 5, a plug 56 is arranged, in particular, which corresponds to the socket of the power connection 42 of the docking station 4. A collar 58 is arranged circumferentially around the plug 56. The collar 58 faces away from the surface of the circuit board of the power module 50. In particular, the collar 58 comprises an extension in this direction that is greater than the longest extension of any contact of the plug 56.

Further power monitoring and/or power control components may be provided on the power module 50. In addition, a connector 60 for a communication bus is disposed on the power module 50.

The communication bus connector 60 allows the communication bus to be connected to the power module 50. In a plug and play manner, the communication bus can receive and connect both a communication module and a user interface module, which will be described further below, to the power module 50. This makes it possible to add modules to the power module 50 by means of the communication module and/or the user interface module, in order to be able to adapt the charging unit 6 to the respective requirements as needed.

In particular, the power module 50 is arranged in a first region of the bottom 41. In a second region of the bottom 41, a fixing means 62 is provided in the present case, which is formed from flanges arranged in a comb-like manner with openings aligned with one another. The illustrated fixing means 62 is formed from two opposing comb-like structures, which enclose an opening 64 in the bottom 41. The at least one fixing means 62 corresponds to at least one fixing means 66 of a receptacle body 68 for a charging bushing 70.

In the assembled state, the charging bushing 70 is arranged directly above the opening 64. Through the opening 64, it is possible to perform a manual emergency release on the charging bushing 70 from the bottom side of the tub assembly 20, through the bottom 41.

In order to mount the mounting body 68 to the tub assembly 20, the mounting body 68 is aligned with its fixing means 66 with respect to the fixing means 62 such that pins 72 can be pushed through the aligned openings. As a result, the pins 72 secure the mounting body 68 to the housing of the tub assembly 20.

Figure 6:
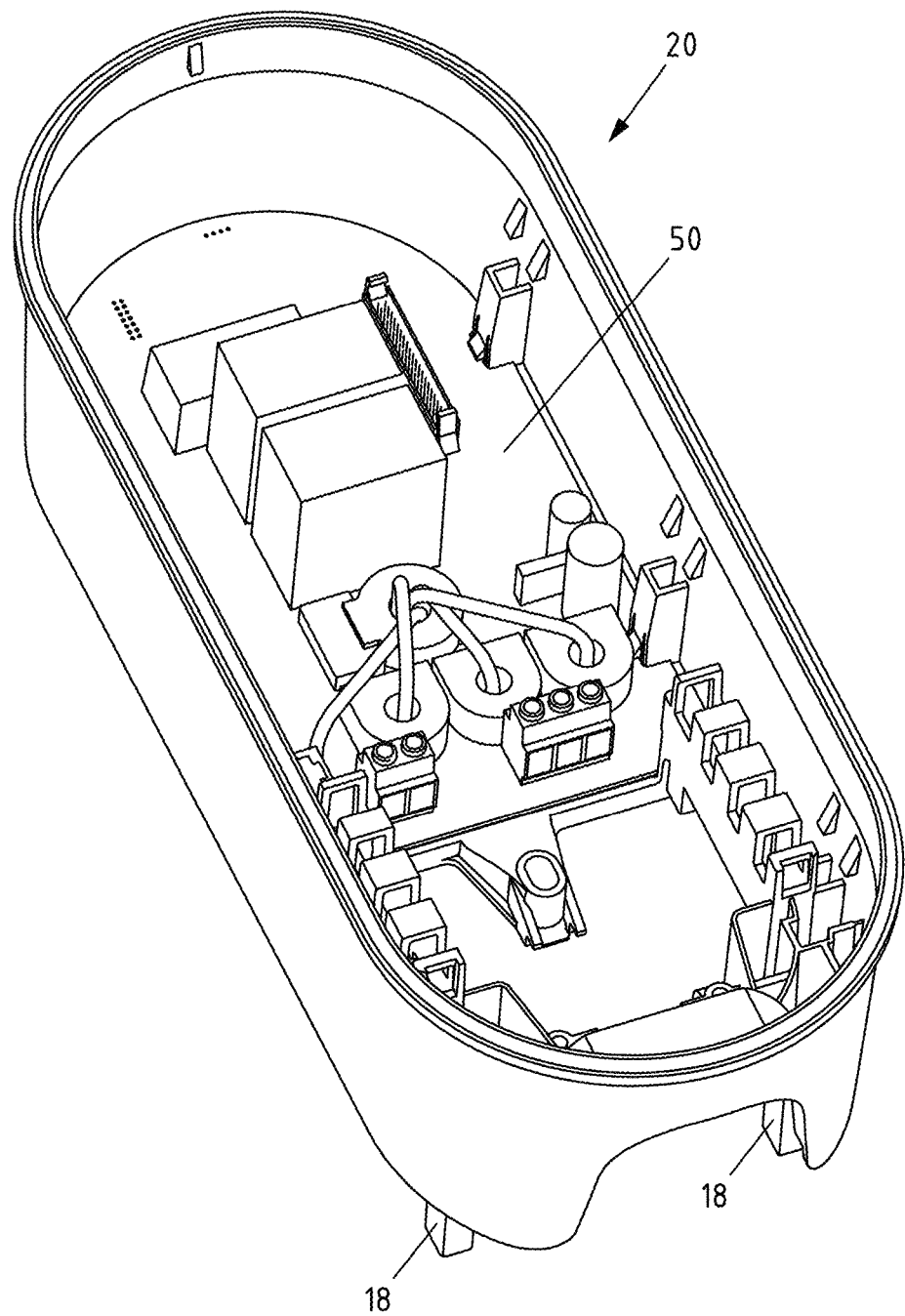
FIG. 6 shows a tub assembly of a charging unit in a partially assembled state.

In a partially assembled state, the power module 50 is inserted into the bottom of the tub assembly 20, as exemplified shown in FIG. 6. In this case, the plug 56 together with the collar 58 is inserted through the opening 74 on the bottom side. The power module 50 is mechanically snapped to the housing 29 of the tub assembly 20 and can be mounted therein, in particular, in a floating manner.

Alternatively or commutatively thereto, it is possible that the mains board 34 is floatingly mounted in the housing of the docking station 4. The floating mounting comprises the advantage that, when the tub assembly 20 is mechanically mounted on the docking station 4, the plug 56 can independently align itself with the socket of the power connector 42. This enhances operability and, in particular, facilitates assembly and attachment, respectively, of the charging unit 6 to the docking station 4 by a layperson.

Figure 7:
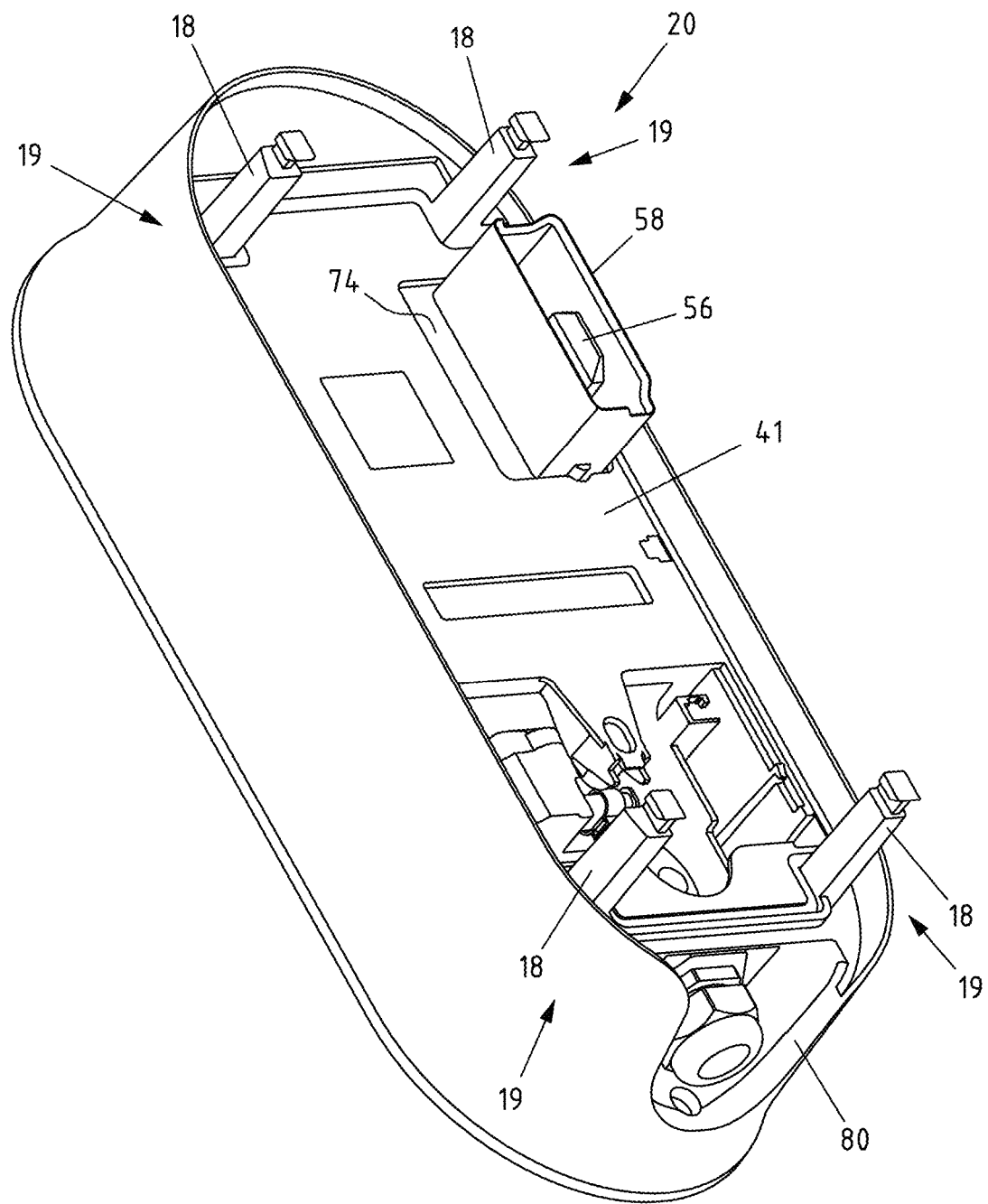
FIG. 7 shows a tub assembly of a charging unit from below.

The bottom side of the tub assembly 20 is shown by way of example in FIG. 7. It can be seen that the charging unit 6 comprises a plurality of bars 18. In particular, one bar 18 is arranged in each corner region 19 of the charging unit 6, in particular, of the tub assembly 20. Thus, the respective position of the bars 18 corresponds to the position of the recesses (cf. FIG. 3).

In particular, it can be seen in FIG. 7 that the bars 18 protrude from the tub assembly 20 facing away from the bottom 41. Furthermore, the collar 58 with the plug 56 can be seen protruding through the opening 74.

The collar 58 engages the opening 14a when the charging device 3 is in the assembled state. In particular, as can be seen in FIG. 4, an annular gap 74 is formed in the opening 14a, which is formed between the socket of the power connector 42 and a collar 78 projecting into the interior of the housing of the docking station 4. The collar 78 provides protection against contact with the docking station 4.

During the assembly, the tub assembly 20 is placed on the docking station 4 and, as can be seen from the combination of FIGS. 4 and 7, hereby the collar 58 slides into the annular gap 76. The collar 58 enters the annular gap 76 before a contact of the plug 56 comes into electrical contact with a contact of the socket of the power connector 42. This prevents that an electric shock occurs when the tub assembly 20 is mounted on the docking station 4. In addition, the charging assembly 6 is oriented such that the bars 18 can engage the corresponding recesses.

In particular, the receiving body 68 is such that it is adapted to receive a wide variety of charging sockets 70 or, in other words, a wide variety of charging sockets 70 may be provided with different receiving bodies 68, wherein each of the fixing means 66 is at the same distance from one another and thus forming a uniform mechanical interface with the fixing means 62. This results in a wide variety of loading sockets 70 being able to be installed in one and the same tub assembly 20, as can be seen from FIGS. 8a-c.

There it can be seen that the fixing means 62, 64 engage with each other and are mechanically snapped together via the pins 72.

Figure 8A:
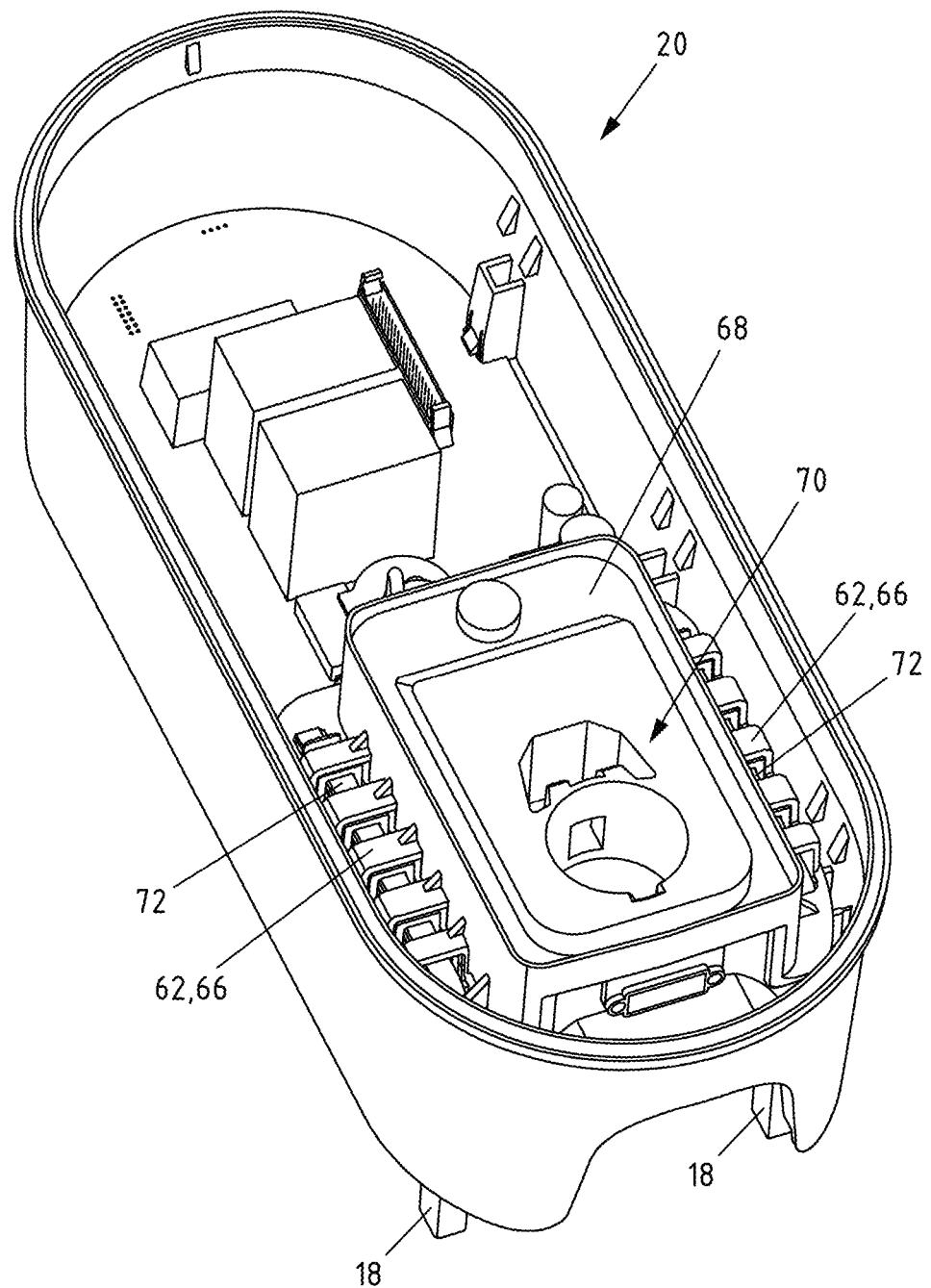
FIGS. 8a-c show an assembled tub assemblies of a charging unit without a cover.
Figure 8B:
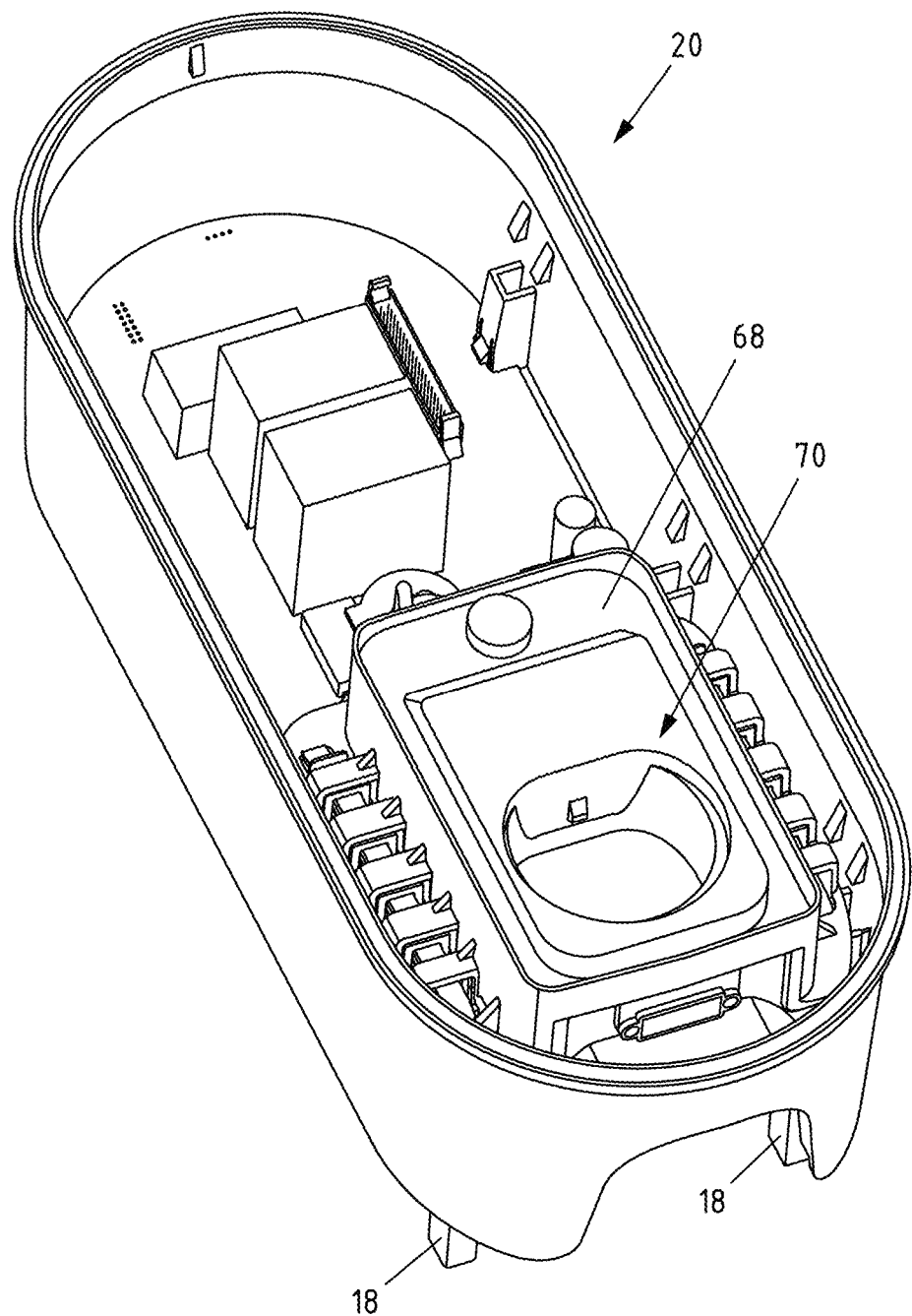
Figure 8C:
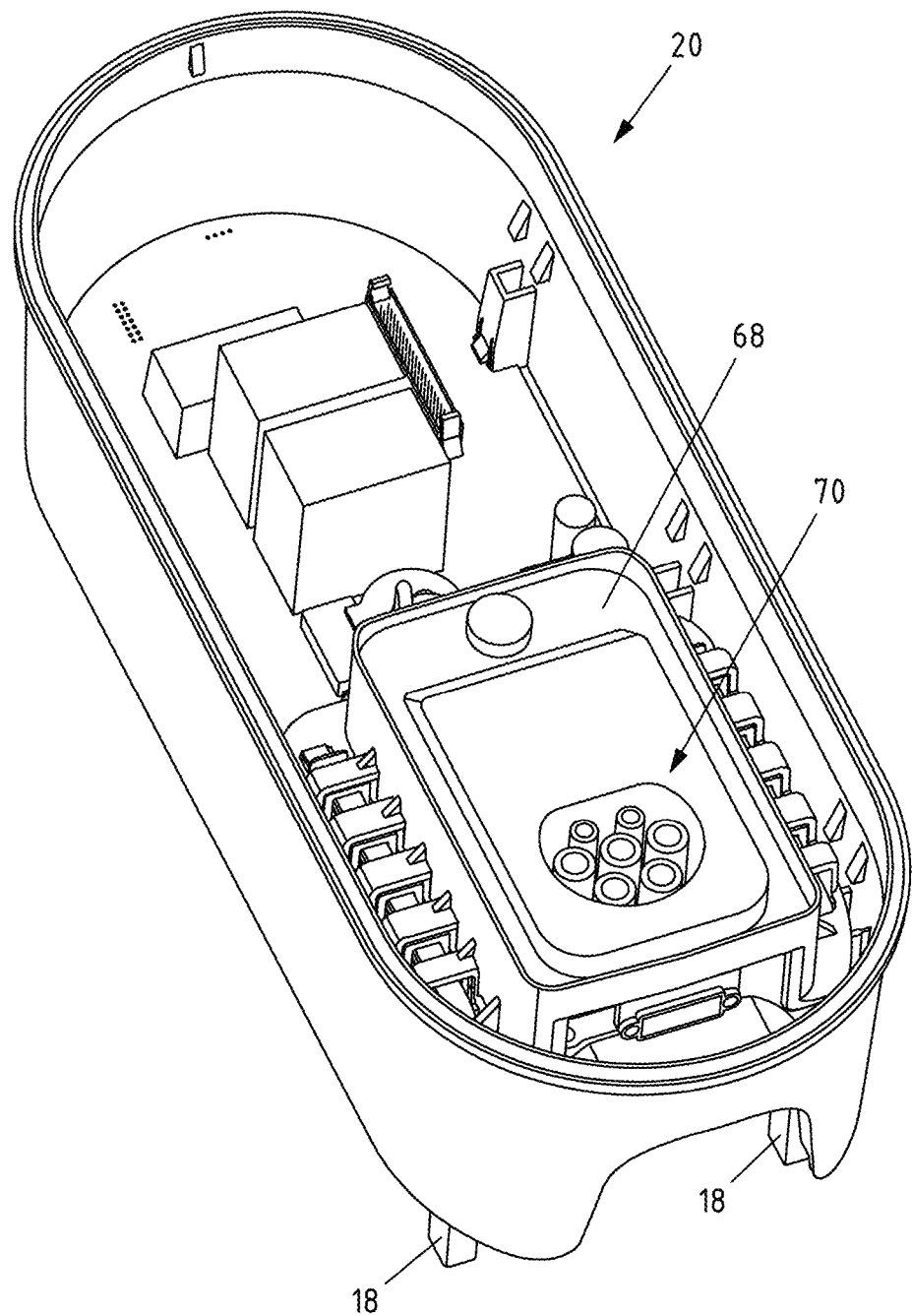

FIG. 8a shows a receptacle body 68 with a CCS charging socket 70 according to IEC 62196, FIG. 8b shows a receptacle body 68 with a Chademo charging socket 70 and FIG. 8c shows a receptacle body 68 with a Type2 charging socket 70 according to IEC 62196-2.

As can be seen in FIGS. 8a-c, the receptacle body 68 makes it possible to accommodate a wide variety of charging sockets 70 without having to make any design changes to the housing of the tub assembly 20.

The charging sockets 70 do not necessarily have to be electrically connected to the charging port 52, but may remain potential free. In this case, the charging sockets 70 may serve as a "plug garage". The charging outlet 52 may be electrically connected to a charging cable fixedly attached to the housing of the tub assembly 20. The charging cable may exit in the region of a recess 80 in the side wall of the tub assembly 20.

If a permanently attached cable is not used, the charging receptacle 70 may be electrically connected to the charging control circuit 54 via the charging port 52. The charging port 52 has three connections for one phase each on one terminal strip, a further terminal strip with two connections for the neutral conductor and the protective conductor and, if necessary, a connection socket for a plug present (PP) contact and a pilot conductor (CP) contact.

To install the charging socket 70, the receptacle body 68 is arranged on the tub assembly 20, the charging socket 70 is connected to the respective terminals of the charging outlet 52 via pre-assembled cables, and then the receptacle body 68 is fixed in the tub assembly 20 via the pins 72.

Figure 9:
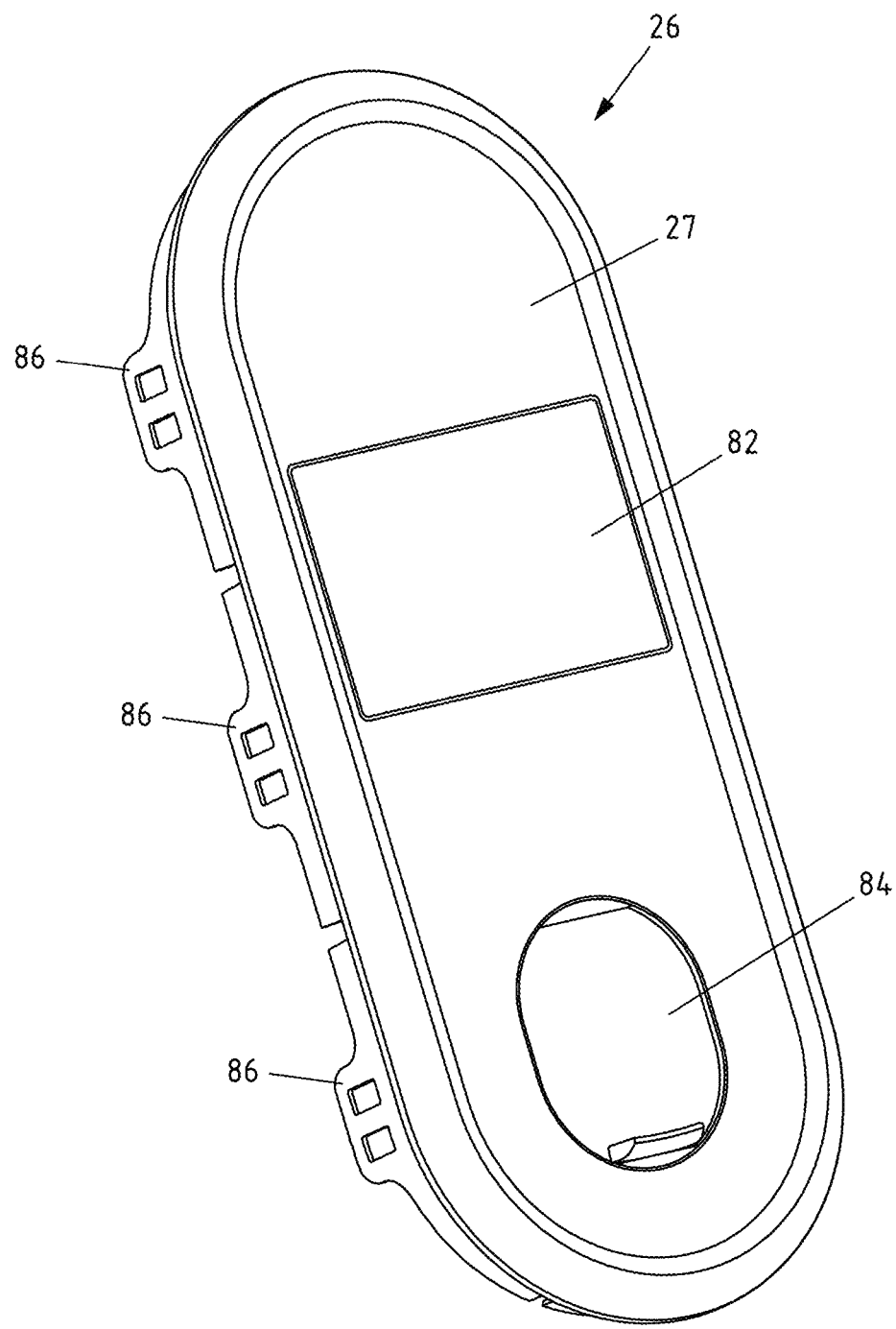
FIG. 9 is a view of a cover assembly of a charging unit.

In addition to the tub assembly 20, the charging unit 6 also comprises the cover assembly 26, as exemplified shown in FIG. 9. In particular, the top surface of the cover assembly 26 is formed as a cover 27 and may optionally comprise various control elements 82 and/or a shutter 84 on a top surface. At the side of the cover assembly 26, at its side edges, snap elements 86 can be provided which can engage with the inner side walls of the tub assembly 20. This allows the cover assembly 26 to be mounted on the tub assembly 20.

The snap elements 86 may be configured to snap to the side walls of the tub assembly 20 and, in particular, can only be released non-destructively when released from the bottom side, starting from the bottom 41 of the tub assembly 20. This prevents the cover assembly 26 from being disengaged from the tub assembly 20 while the tub assembly 20 is still electrically connected to the mains board 34 of the docking station 4.

Figure 10:
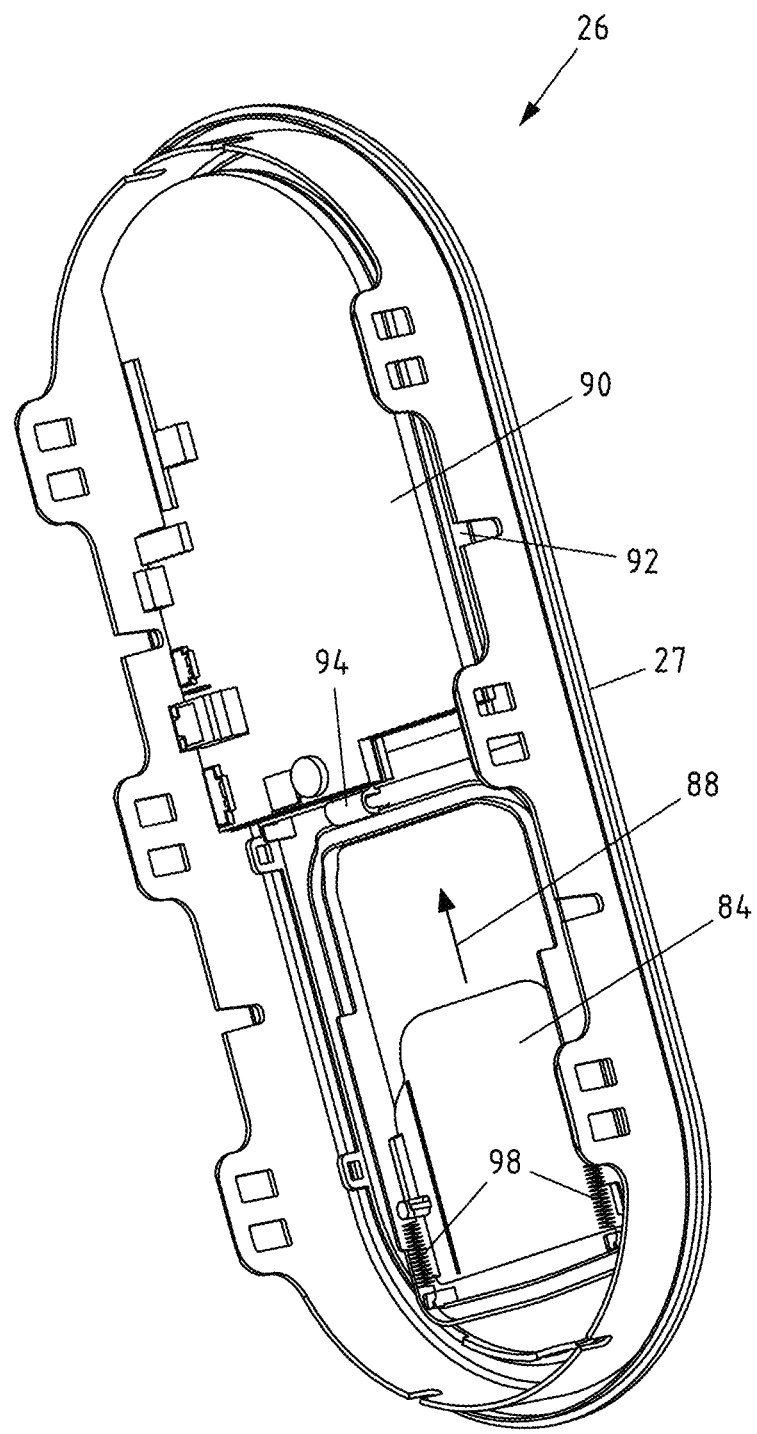
FIG. 10 is a bottom view of a cover assembly of a charging unit.
Figure 11:
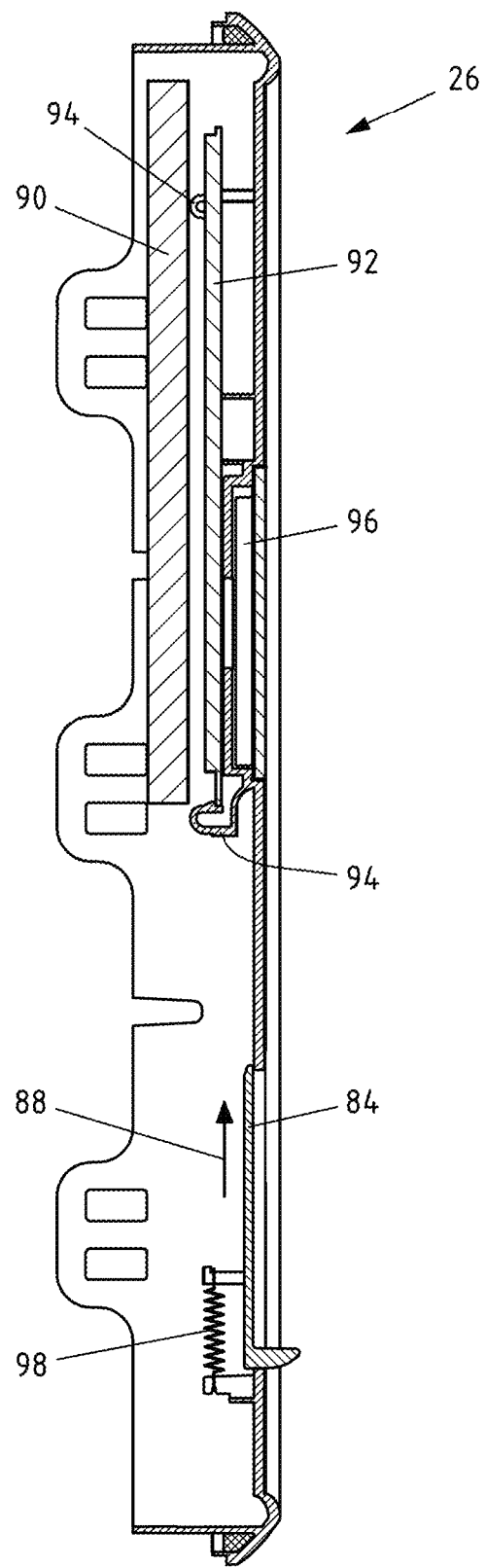
FIG. 11 is a sectional view of a cover assembly of a charging unit.

At the rear side of the cover assembly 26, as exemplified shown in FIG. 10, the shutter 84 is mounted such that it can be moved in a direction of movement 88 to release the charging port 70. As shown in FIG. 11, the shutter 84 is spring-loaded by a spring 98 so that it automatically moves to the closed position shown.

In a further region, a communication module 90 and a user interface module 92 are disposed in the housing 29 of the charging unit 6, preferably as shown in FIG. 11, in the cover assembly 26. The communication module 90 as well as the user interface module 92 can be mechanically fixed to the cover assembly 26 and its housing 29, respectively.

In particular, the communication module 90 is configured to provide (far-field and/or near-field) communication for the charging unit 6, in particular, for the charging station. In particular, the communication module 90 may comprise a communication antenna to provide wireless communication with devices (e.g., backend system, mobile user terminal, etc.) positioned remotely from the charging station. The at least one communication antenna may be a far-field antenna or a near-field antenna, such as an LTE antenna, GSM antenna, WLAN antenna, Bluetooth antenna, and/or GPS antenna.

The communication module 90 is preferably connected (for internal communication) via the communication bus to the power module 50 and, in particular, to the user interface module 92.

The communication module 90 may further optionally comprise a charging control circuitry, not shown in detail, that has electrical access to the charging port 52. The charge control circuit may override or at least be coupled to the charge control circuit 54, such that the two charge control circuits may carry out a coordinated control of a charging process.

FIG. 11 shows a preferred embodiment of the communication module 90 and the user interface module 92 in the housing 29, preferably in the cover assembly 26. In particular, the user interface module 92 faces the inside of the cover 27 and is preferably mechanically connected to the housing 29 of the cover assembly 26 via, for example, click connections 94. The communication module 90 is in turn also connected to the housing 29 of the cover assembly 26 via connections not shown in detail. Starting from the cover assembly 27, the user interface module 92 and then the communication module 90 are arranged in a stacked matter.

Starting from the cover 27, the at least one communication antenna (not shown) arranged on the communication module 90 may be at least partially, preferably predominantly, uncovered by the user interface module 92. In particular, at least 50% of the antenna area of the communication antenna, preferably at least 70% of the antenna area of the communication antenna, more preferably 100% of the antenna area of the communication antenna, may be uncovered.

The user interface module 92 is preferably arranged stationary with respect to the inner side of the cover assembly 26, so that an exact positioning of the at least one component of the user interface module 92, in particular, of the at least one user interface antenna, with respect to the cover 27 and the upper side 27, respectively, of the cover assembly 26 is ensured. In particular, a display 96 may be optionally disposed in the cover assembly 26 and controlled by the user interface module 92 and/or the communication module 90.

Figure 12:
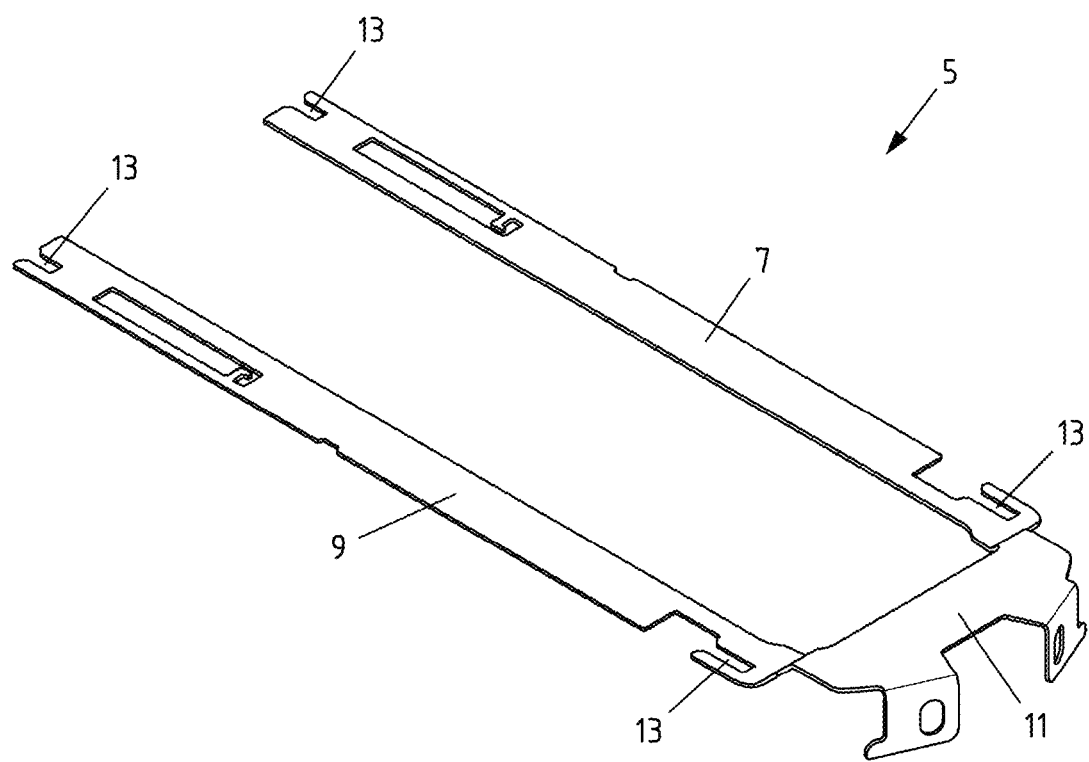
FIG. 12 is a schematic view of an embodiment of a locking module.

FIG. 12 shows an embodiment of a locking module 5 according to the present application. In the present embodiment, the locking module 5 is formed as a locking bracket 5. In particular, a locking bracket 5 may be formed in a U-shape and preferably comprise two legs 7, 9 extending substantially parallel to each other and substantially identically dimensioned legs 7, 9 connected to each other via a connecting element 11.

The connecting element 11 preferably provides a handle element and handle function, respectively, which can be operated by a user to move the locking element between a locked position and an open position.

Furthermore, the locking module 5 comprises a plurality of second locking elements 13, in particular snapping elements 13. In the present embodiment, the locking elements 13 are formed as recesses 13 and openings 13, respectively, in the legs 7, 9.

In the present embodiment, four locking elements 13 are provided, the respective positions of which correspond to the positions of the recesses 16 of the docking station 4 and to the positions of the bars 18 of the charging unit 6, so as to enable the bars 18 to be fixed to the docking station 4, as will be described in more detail.

Figure 13:
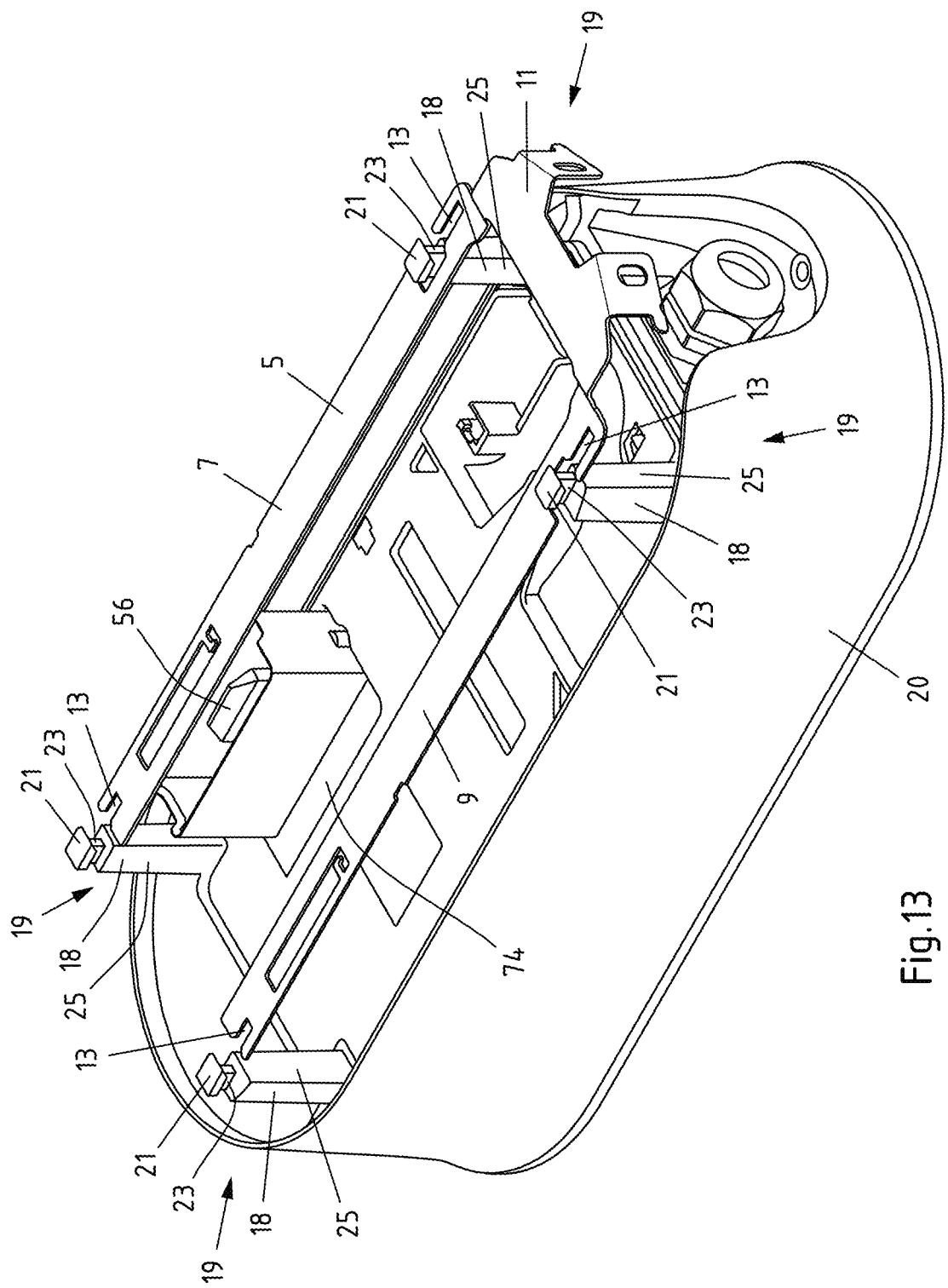
FIG. 13 is a schematic view of an embodiment of a charging unit with a locking module in an open position.

FIG. 13 shows a schematic view of an embodiment of a charging unit 6, in particular, a tub assembly 20, with a locking module 5 in an open position. It should be noted here that, for the sake of a better overview, the docking station 4 to which the charging unit 6 is fixed by the locking module 5 is not shown.

A bar 18 is attached to the bottom of the tub assembly 20 via a bar section 25. Adjacent to the bar section 25 is a first locking element 21, 23 presently a pin section 23 and then a locking head 21. The thickness or the outer diameter of the pin section 23 is smaller than the thickness or the outer diameter of the locking head 21. The thickness and the outer diameter, respectively, of the pin section 23 corresponds here with the diameter of a corresponding recess 13, so that the pin section 23 can be inserted into the recess. However, the outer diameter of the in section 23 is smaller than the outer diameter of the locking head 21.

In the open position shown, the locking module 5 allows the bars 18 to be inserted into the recesses (not shown) of the docking station 4 in such a way that the bars 18 reach and are in, respectively, a locking position.

Figure 14:
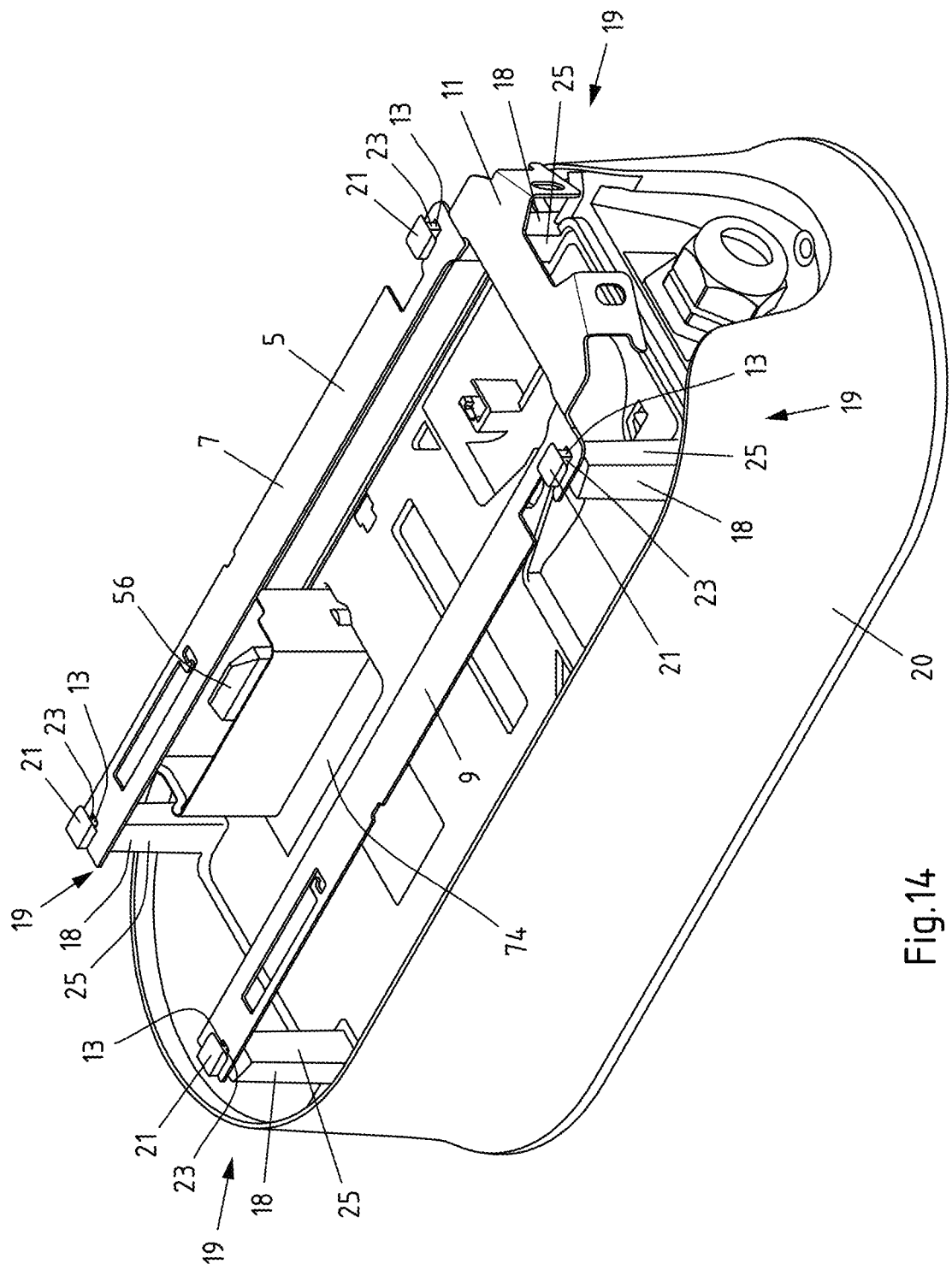
FIG. 14 is a schematic view of an embodiment of the charging unit with the locking module in a locked position.

FIG. 14 shows the embodiment according to FIG. 13, in which the locking module 5 is in a locking position. In particular, it can be seen from FIGS. 13 and 14 that by a movement of the locking module 5 from the open position (FIG. 13) to the locking position (along a straight line) (FIG. 14), the bars 18 are fixed. In particular, the respective recesses 13 engage behind the respective locking heads 23 and thereby positively fix the bars 18 to the docking station 4. In particular, a movement of the bars 18 in a direction along the bar axis is blocked due to the snapping (interlocking) of the first and second locking elements with each other, so that the bars 18 cannot be guided out of the respective recesses 16 (without moving the locking module 5 from the locked position to the open position).

Figure 15:
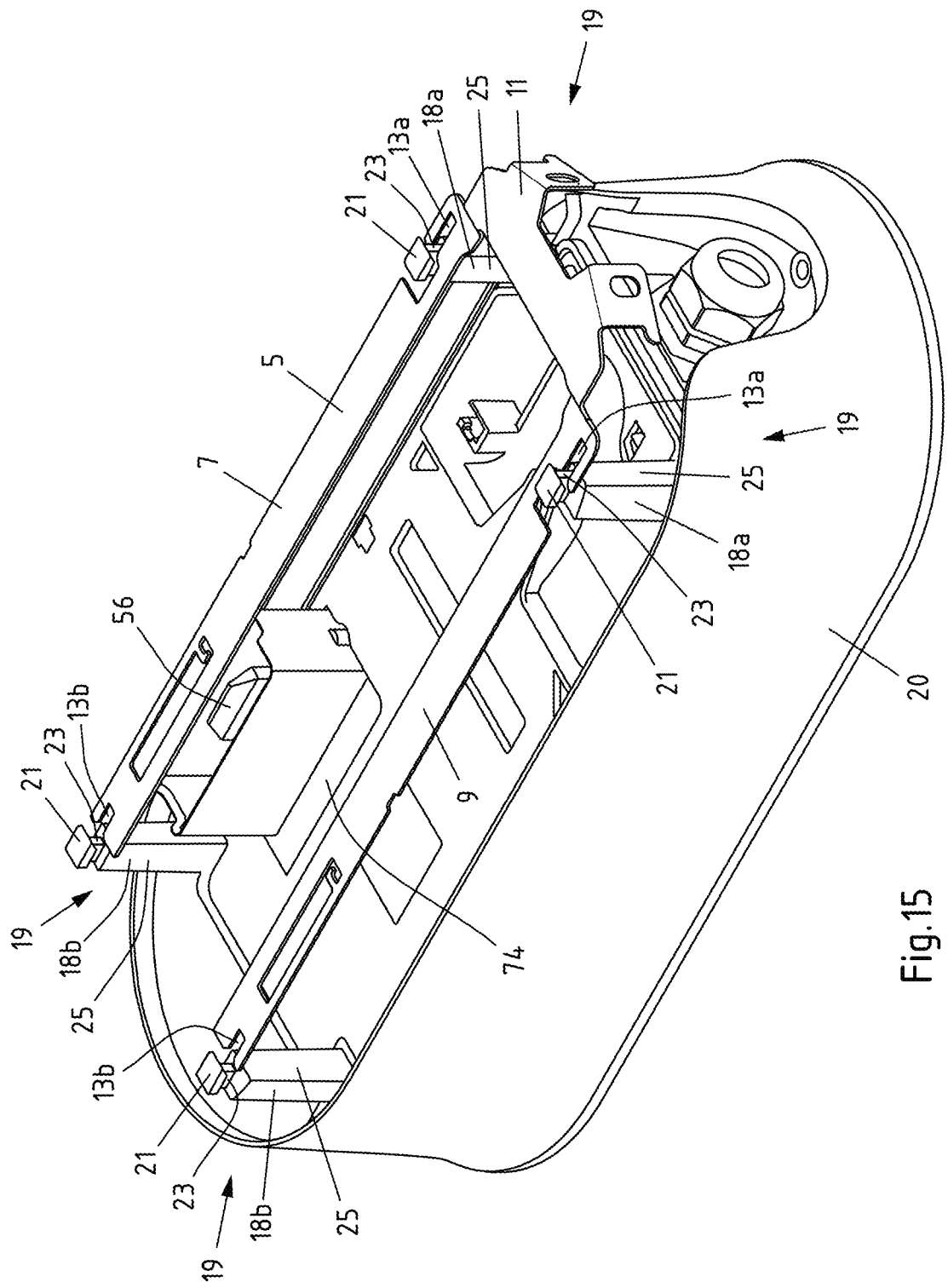
FIG. 15 is a schematic view of an embodiment of the charging unit with the locking module in an intermediate locking position.

FIG. 15 shows a schematic view of the embodiment of the charging unit 6 according to FIGS. 13 and 14 with the locking module 5 in an optional intermediate locking position. As can be seen, the recesses 13a, 13b are formed such that in the intermediate locking position only the first recesses 13a positively fix the first bars 18a, while the second bars 18b are not yet locked by the second recesses 13b.

This allows a user, when mounting the charging unit 6, to first insert the first bars 18a into corresponding (not shown) recesses of the docking station by applying a force in the present lower area until they reach the locking position. The further bars 18b need not yet have reached the snapping position, but the locking module 5 can already be moved from the open position to the intermediate locking position shown, in order to snap the first bars 18a to the docking station through the recesses 13a.

Subsequently, by applying a force in the present upper region, the user can insert the second bars 18b into corresponding (not shown) recesses of the docking station until they reach the snapping position. Then the locking module can be moved further to the locking (end) position shown in FIG. 14, in which all bars 18 are positively fixed to the docking station. A particularly simple assembly of the charging device 3 can be provided.

Figure 16:
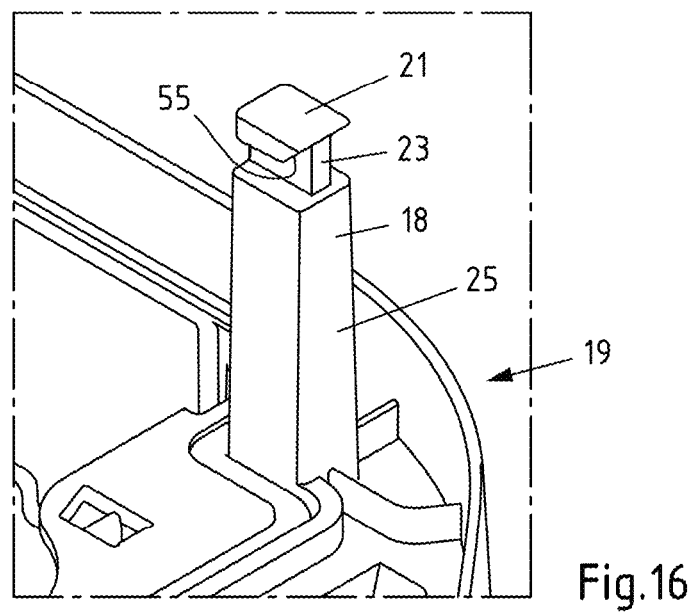
FIG. 16 is a schematic detailed view of a bar.

FIG. 16 shows an exemplary a schematic detailed view of a bar. The bar 18 can have a substantially rectangular base surface. In order to support slipping or insertion of the bar 18, in particular of the pin section 23, into the respective recess 13, the locking head preferably comprises a beveled surface 55.

In particular, the beveled surface 55 is arranged on the side of the locking head 21 that faces the (respective) second locking element 13 in the open position of the locking module 5. Due to the inclination of the beveled surface 55, the respective recess 13 can more easily engage behind the first locking element 21, 23. A jamming of the locking module 5 during a movement from the open position to the locking position can be prevented. In particular, all locking heads (or domes) can be designed accordingly.

Figure 17:
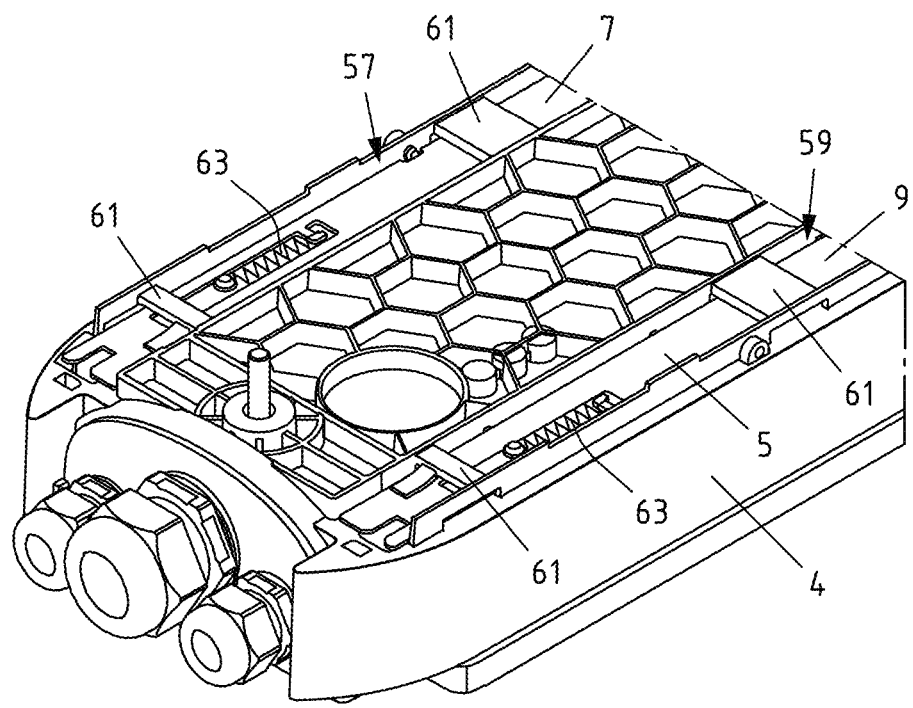
FIG. 17 is a schematic view of an embodiment of a docking station with a locking module.

FIG. 17 shows a schematic view of an embodiment of a docking station 4 with a locking module 5. In particular, the locking module 5 is mounted in guides 57, 59. In particular, a respective guide 57, 59 is provided in the present case for each leg 7, 9, wherein each guide corresponds to the respective leg 7, 9, in particular, with respect to shape and dimensioning. The supporting elements 61 serve to ensure that the locking module 5 remains permanently integrated in the docking station 4, i.e. in any operating state. In particular, the locking module 5 remains in the docking station 4 during all operating conditions.

Furthermore, at least one spring element 63 is arranged in each of further recesses of the legs 7, 9. In particular, two spring elements 63 are presently mounted between the locking module 5 and the docking station 4 in such a way that, in the open position, a force acting in the direction of the locking position is exerted on the locking module 5 by the spring element 63.

In particular, this can provide an automatic movement of the snap module 5 from the open position to the locking position when the bars 18 are in the snapped position. For example, a spring element 63 may be provided between each leg 7, 9 and the docking station 4.

Figure 18:
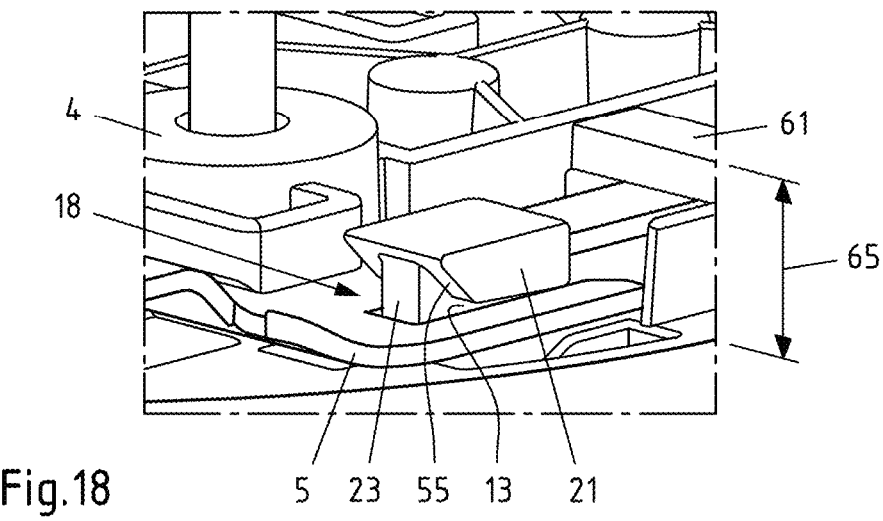
FIG. 18 is a schematic detailed view of a bar in a locked state.

FIG. 18 shows a schematic detailed view of a preferred embodiment of a bar 18 in a locked state. As can be seen, the bar 18 engages in the locking module 5 in such a way that a positive fixing to the docking station 4 takes place.

The arrow provided with the reference sign 65 indicates that in the locked position, in particular, in the illustrated assembled state of the charging device 3, i.e. when the charging unit 6 is attached to the docking station 4, a pressure is applied which allows a permanent seal between the charging unit 6 and the docking station 4 using a (not shown) sealing element.

In particular, in the locked position and the assembled state, respectively, of the charging device 3, a clamping of the sealing element (e.g. a compression of a foam seal or the like) between the charging unit 6, in particular, the tub assembly 20 of the charging unit 6, and the docking station 4, in particular, the protective cover housing 12 of the docking station 4, can be provided and, in particular, maintained in the assembled state of the charging device 3.

Figure 19:
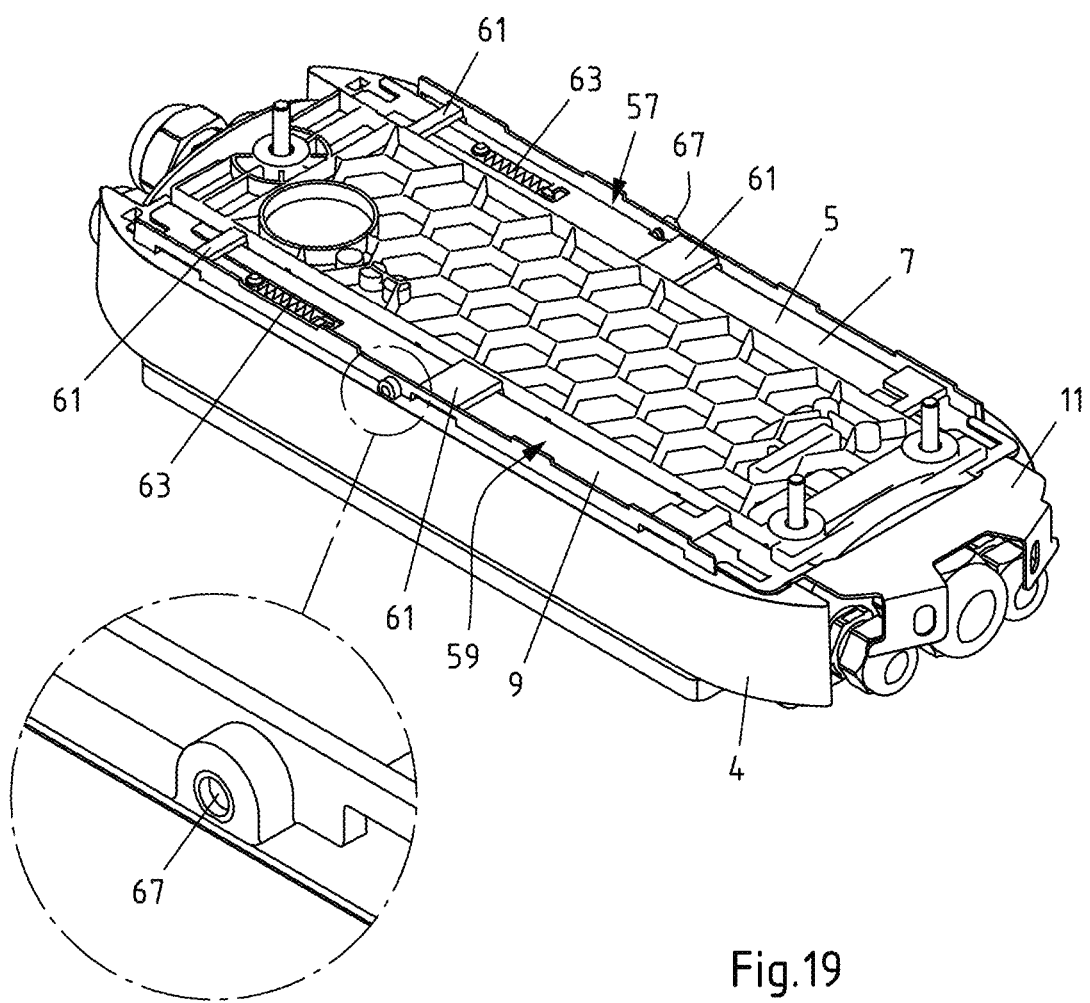
FIG. 19 is a schematic view of an embodiment of the docking station with a locking module.

FIG. 19 shows a schematic view of an embodiment of the docking station 4 with a locking module 5 and optional fixing elements 67. In particular, screw fittings 67 can be provided as fixing elements 67 on the side wall of the docking station 4. In particular, a screw 67 can be screwed into a corresponding receptacle in the docking station 4 when the locking module 5 is in the locking position. By an insertion of the fixing elements 67, a movement of the locking module 5, in particular, from the locking position to the open position, can be blocked.

REFERENCE LIST 2 charging column
2a receptacle
3 charging device
4 docking station
5 locking module
6 charging unit
7 leg of the locking module
8 cable entry
9 leg of the locking module
10 side wall
11 connecting element of the locking module
12 cover
13 second locking element, in particular, a snapping element
14 recess 16 recess ((receptacles) and opening, respectively
18 bar
20 tub assembly
21 first locking element, in particular, a snapping element
22 power module
23 pin section
24 charging socket
25 bar section
26 cover assembly
27 cover
28 snapping elements
29 housing
30 snapping elements
32 side walls
34 mains board
36 interface board
38 connection strip
39 side wall
40 scale
41 bottom
42 power connection
44 receptacle
46 connection socket
48 connectors
50 power module
52 charging connection
54 charge control circuit
55 beveled surface
56 plug
57 guide
58 collar
59 guide
60 connector
61 guide element
62 fixing means
63 spring element
64 opening
65 fixing element
66 fixing means
68 receptacle body
70 charging socket
72 pin
74 opening
76 annular gap
78 collar
80 recess
82 operating element
84 shutter
86 snap element
88 direction
90 communication module
92 user interface module
94 click connection
96 display

What is claimed is:

1. A charging device for electric vehicles, comprising:
at least one docking station,
at least one charging unit attachable to the docking station,
wherein a plurality of recesses are provided in the docking station,
wherein the charging unit comprises a plurality of bars which are insertable into the recesses of the docking station and each of which comprises at least one first locking element
at least one locking module movable between a locking position and an open position, which comprises a plurality of second locking elements corresponding to the first locking elements
wherein, in the open position of the locking module, the bars are insertable into the recesses in such a way that the bars are movable into a snapping position, and
wherein, in the snapping position, the locking module is movable from the open position into the closed position in such a way that the bars are fixable in a form-fitting manner to the docking station by an interaction of the second locking elements with the first locking elements.

2. The charging device according to claim 1, characterized in that
the charging unit comprises at least one tub assembly,
wherein the bars are arranged on the bottom side of the tub assembly and extend away from the interior of the tub assembly.

3. The charging device according to claim 1, characterized in that
the locking module is formed as a locking bracket with two legs extending parallel to each other and a connecting element connecting the legs,
wherein each leg comprises at least one second locking element.

4. The charging device according to claim 1, characterized in that
the bars comprise a pin section with a locking head as the first locking element,
wherein in the snapping position by a movement of the locking module from the open position into the locking position an engaging of the snapping head behind a recess of the locking module formed as the second locking element is carried out.

5. The charging device according to claim 1, characterized in that
the locking module is only movable from the open position into the locking position when all of the bars are in the snapping position.

6. The charging device according to claim 1, characterized in that
the locking module is movable from the open position to an intermediate locking position when at least one first bar is in the snapping position, and
the locking module is movable from the intermediate locking position into the locking position when at least one second bar is in the snapping position.

7. The charging device according to claim 1, characterized in that
the locking module is fixedly integrated in the docking station, and
the docking station comprises at least one guide configured to guide the locking module during a movement between the open position and the closed position.

8. The charging device according to claim 1, characterized in that
at least one spring element is fixed between the locking module and the docking station in such a way that in the open position a force acting in the direction of the locking position is exerted on the locking module by the spring element.

9. The charging device according to claim 1, characterized in that at least one fixing element is provided configured to fix the locking in the locking position in such a way that a movement of the locking module is blocked when the fixing element is fixed.

10. The charging device according to claim 1, characterized in that at least one sealing element is provided between the docking station and the charging unit, and in the locking position, a seal is provided between the docking station and the charging unit.

11. A charging station, comprising:

at least one charging column with a receptacle, and at least one charging device according to any of the preceding claims arrangeable in the receptacle.

* * * * *